(12) United States Patent
Li et al.

(10) Patent No.: US 12,090,740 B2
(45) Date of Patent: Sep. 17, 2024

(54) ALTERNATE FILM PASTING DEVICES FOR HARD-CASE SECONDARY BATTERIES

(71) Applicant: SHENZHEN UTIMES INTELLIGENT EQUIPMENT CO., LTD., Guangdong (CN)

(72) Inventors: Junli Li, Shenzhen (CN); Jianjun He, Shenzhen (CN); Caiwei Yan, Shenzhen (CN); Guoping Zhang, Shenzhen (CN)

(73) Assignee: SHENZHEN UTIMES INTELLIGENT EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 18/437,267

(22) Filed: Feb. 9, 2024

(65) Prior Publication Data
US 2024/0173955 A1    May 30, 2024

Related U.S. Application Data

(63) Continuation-in-part of application No. PCT/CN2023/091911, filed on Apr. 29, 2023.

(30) Foreign Application Priority Data

May 9, 2022 (CN) .......................... 202210497622.4

(51) Int. Cl.
*B32B 38/18* (2006.01)
*B32B 37/20* (2006.01)
(Continued)

(52) U.S. Cl.
CPC .............. *B32B 38/18* (2013.01); *B32B 37/20* (2013.01); *B32B 38/0004* (2013.01); *H01M 10/0404* (2013.01); *B32B 2457/10* (2013.01)

(58) Field of Classification Search
None
See application file for complete search history.

(56) References Cited

U.S. PATENT DOCUMENTS

| 4,920,731 | A | 5/1990 | Rimondi et al. |
| 9,694,449 | B2 * | 7/2017 | Hwang ............... H01M 10/425 |
| | | (Continued) | |

FOREIGN PATENT DOCUMENTS

| CN | 204660064 U | 9/2015 |
| CN | 204916294 U | 12/2015 |
| | (Continued) | |

OTHER PUBLICATIONS

First Office Action in Chinese Application No. 202210497622.4 mailed on Jun. 16, 2022, 19 pages.
(Continued)

*Primary Examiner* — Michael N Orlando
*Assistant Examiner* — Abhishek A Patwardhan
(74) *Attorney, Agent, or Firm* — PORUS IP LLC

(57) ABSTRACT

The present application relates to the technical field of battery manufacturing, and relates to an alternate film pasting device for hard-case secondary batteries. The film pasting device comprises a frame, a material feeding apparatus, and two film feeding apparatuses; the frame is provided with a material feeding channel used for conveying bare materials, and a film pasting channel used for pasting an insulating film onto the bare materials is provided at an output end of the material feeding channel; the material feeding apparatus is disposed on the frame, the material feeding apparatus comprises two material pushing mechanisms, and the two material pushing mechanisms are used for alternately pushing the bare materials from the material feeding channel to the film pasting channel; the two material pushing mechanisms are capable of both reciprocating along a vertical
(Continued)

direction, and one of the two material pushing mechanisms is capable of moving downward after pushing a part of the bare materials to the film pasting channel so as to avoid the other material pushing mechanism to push the other bare materials to the film pasting channel; and the two film feeding apparatuses are both disposed on the frame, and are used for alternately conveying, in turn, the insulating films to the bare materials reaching the film pasting channel.

8 Claims, 13 Drawing Sheets

(51) Int. Cl.
  *B32B 38/00* (2006.01)
  *H01M 10/04* (2006.01)

(56) References Cited

U.S. PATENT DOCUMENTS

| | | | | |
|---|---|---|---|---|
| 10,613,583 | B2* | 4/2020 | Chang | G06F 1/1635 |
| 10,800,560 | B2* | 10/2020 | Hayami | B65D 5/5028 |
| 11,043,669 | B2* | 6/2021 | Kim | H01M 4/366 |
| 2013/0029212 | A1 | 1/2013 | Hong | |

FOREIGN PATENT DOCUMENTS

| | | |
|---|---|---|
| CN | 109353766 A | 2/2019 |
| CN | 106428746 B | 10/2019 |
| CN | 110459794 A | 11/2019 |
| CN | 209626261 U | 11/2019 |
| CN | 111864245 A | 10/2020 |
| CN | 212126715 U | 12/2020 |
| CN | 113264409 A | 8/2021 |
| CN | 214930965 U | 11/2021 |
| CN | 114597471 A | 6/2022 |

OTHER PUBLICATIONS

Notification to Grant Patent Right for Invention in Chinese Application No. 202210497622.4 mailed on Jun. 27, 2022, 5 pages.
International Search Report in PCT/CN2023/091911 mailed on Jun. 23, 2023, 7 pages.
Written Opinion in PCT/CN2023/091911 mailed on Jun. 23, 2023, 7 pages.

* cited by examiner

ALTERNATE FILM PASTING DEVICES FOR HARD-CASE SECONDARY BATTERIES

CROSS-REFERENCE TO RELATED APPLICATIONS

This application is a continuation-in-part application of International Application No. PCT/CN2023/091911, filed on Apr. 29, 2023, which claims priority to Chinese Patent Application No. 202210497622.4, filed on May 9, 2022, the entire contents of which are hereby incorporated by reference.

TECHNICAL FIELD

The present disclosure belongs to the technical field of battery manufacturing devices, and in particularly to an alternate film pasting device for a hard-case secondary battery.

BACKGROUND

During the manufacturing process of square aluminum-case batteries, an insulating film needs to be applied to an outside of a bare battery to achieve electrical isolation. In the related prior art, a film pasting device using a single reciprocating material feeding apparatus and a single reciprocating film feeding apparatus may be used for U-shaped film pasting or film pasting shaped like a Chinese character "回". When the single material feeding apparatus returns to push materials and the single film feeding apparatus returns to draw the film, the film pasting device may be in a state waiting for the materials, which results in low production efficiency of film pasting.

SUMMARY

The purpose of the embodiments of the present disclosure is to provide an alternate film pasting device for a hard-case secondary battery, aiming to solve the problem in the prior art that the film pasting device using the single reciprocating material feeding apparatus and the single reciprocating film feeding apparatus has low production efficiency.

In order to achieve the above purpose, one aspect of the present disclosure provides an alternate film pasting device for a hard-case secondary battery. The alternate film pasting device may comprise a frame provided with a material feeding channel used for conveying bare materials. A film pasting channel used for pasting an insulating film onto the bare materials may be provided at an output end of the material feeding channel. The alternate film pasting device may also comprise a material feeding apparatus disposed on the frame. The material feeding apparatus may comprise two material pushing mechanisms used for pushing the bare materials from the material feeding channel to the film pasting channel. The two material pushing mechanisms may both reciprocate along a vertical direction. One of the two material pushing mechanisms may move downward and retract after pushing a part of the bare materials to the film pasting channel to avoid the other of the two material pushing mechanisms, and the other of the two material pushing mechanisms may push the other of the bare materials to the film pasting channel. The alternate film pasting device may further comprise two film feeding apparatus both disposed on the frame and used for alternately conveying, in turn, the insulating film to the bare materials reaching the film pasting channel.

In some embodiments, the material feeding apparatus may further include a base, two half-material racks, and a material pushing and bearing plate. The base may be horizontally disposed on the frame, and the two half-material racks may be disposed on the base at intervals to form the material feeding channel. The material pushing and bearing plate may be vertically disposed on the base and located between the material feeding channel. The material pushing and bearing plate may be disposed between the two half-material racks. An extension direction of the material pushing and bearing plate may be parallel to an extension direction of the material feeding channel. The two material pushing mechanisms may be disposed on two opposite sides of the material pushing and bearing plate, respectively. Each of the two material pushing mechanisms may include a material pushing component and a material pushing drive component. The material pushing component may be slidably disposed on the material pushing and bearing plate along the extension direction of the material pushing and bearing plate. An output end of the material pushing component may be used for pushing the bare materials from the material feeding channel to the film pasting channel. An output end of the material pushing drive component may be connected with the material pushing component to drive the material pushing component to slide on the material pushing and bearing plate.

In some embodiments, the material pushing component may include a material pushing slide plate and a material pushing part. The material pushing slide plate may be slidably disposed on the material pushing and bearing plate along an extension direction of the material feeding channel. The material pushing drive component may be connected with the material pushing slide plate. The material pushing part may include a pusher and a material pushing bracket. The pusher may be disposed above the material pushing slide plate. The material pushing drive component may be used for driving the material pushing slide plate to slide, so that the pusher may push the bare materials to move in the material feeding channel. The material feeding apparatus may further include two lifting mechanisms connected with two material pushing slide plates, respectively. Each of the two lifting mechanisms may include a lifting slide plate and a lifting drive part. The lifting slide plate may be slidably disposed on each of the two material pushing slide plates in a vertical direction. An output end of the lifting drive part may be connected with the lifting slide plate. The pusher may be disposed above the lifting slide plate through the material pushing bracket. The lifting drive part may be used for pushing the lifting slide plate to move vertically to make the pusher to reciprocate in the vertical direction. One of the two pushers may be driven to move downward by the lifting drive part after one of the two pushers pushes a part of the bare materials to the film pasting channel, so as to avoid the other of the two pushers, and the other of the two pushers may push the other of the bare materials to the film pasting channel.

In some embodiments, the two film feeding apparatuses may be symmetrically and vertically arranged along a center line of an entrance of the film pasting channel. Each of the two film feeding apparatuses may include a film drawing mechanism. The film drawing mechanism may be disposed on the frame. The film drawing mechanism may include a film drawing support, two film drawing slide plates, a film drawing rod, and a film drawing drive component. The film drawing support may be vertically disposed on the frame. The two film drawing slide plates may be slidably disposed on two opposite sides of the film drawing support in the vertical direction. Two ends of the film drawing rod may be respectively connected with the two film drawing slide plates. A film head of the insulating film may be adhered to an outer periphery of the film drawing rod. An output end of the film drawing drive component may be connected with the two film drawing slide plates. The film drawing drive component may be used for driving the film drawing rod to move vertically near the entrance of the film pasting channel, so that the insulating film may incline toward the entrance of the film pasting channel in the vertical direction. The film drawing rod located above may be used for driving the film head of the insulating film to move downward and blocking the entrance of the film pasting channel to prepare for film pasting. After the bare materials pass through the film pasting channel, the film drawing rod located above is capable of moving upward to remove a film and retracting to a position above and near the entrance of the film pasting channel to continue to paste the insulating film above to prepare for next film drawing. The film drawing rod located below may be used for driving the film head of another insulating film to move upward and block the entrance of the film pasting channel to prepare for film pasting. After the other of the bare materials passes through the film pasting channel, the film drawing rod located below is capable of moving downward to remove the film and retracting to a position below and near the entrance of the film pasting channel and continue to paste the other of another insulating film below to prepare for the next film drawing.

In some embodiments, each of the two film feeding apparatuses may further include a film releasing mechanism. The film releasing mechanism may be disposed on one side of the film drawing mechanism. The film releasing mechanism may include a film releasing bracket, a film releasing roller, and a collecting roller. The film releasing bracket may be disposed on the frame. The film releasing roller and the collecting roller may be both disposed on the film releasing bracket. The film releasing roller may be used for supporting a rolled double-layer film. The double-layer film may include the insulating film and a release film. The insulating film may be drawn by the film drawing rod to separate the insulating film from the release film. The collecting roller may be used for rolling the release film to collect the release film.

In some embodiments, the material feeding apparatus may further include a transfer mechanism. The transfer mechanism may include a transfer drive part and a transfer bracket. The transfer bracket may be fixed on the frame. The transfer drive part may be fixed on the transfer bracket. A movable end of the transfer drive part may be connected with the base to drive the base to slide on the frame along an extension direction of the material feeding channel.

In some embodiments, the alternate film pasting device may further include a film pasting apparatus located at a side of each of the two film feeding apparatuses away from the material feeding apparatus and disposed on the frame. The film pasting apparatus may include a film pasting bracket and two film pasting rollers. The film pasting bracket may include a film pasting bracket body and two film pasting slide plates. The film pasting bracket body may be disposed on the frame. The two film pasting slide plates may be slidably disposed on a side wall of the film pasting bracket body close to the material feeding apparatus at an opposite position. The two film pasting rollers may be rollable disposed at ends of the two film pasting slide plates close to each other. The film pasting channel used for pasting the insulating film onto the bare materials may be formed between the two film pasting rollers. The film pasting apparatus may further include two film pasting drive parts which are connected with the two film pasting slide plates, respectively, to drive the two film pasting rollers to move toward or away from each other.

In some embodiments, the alternate film pasting device may further include two film cutting apparatuses. The two film cutting apparatuses may be disposed on the film pasting bracket body and located above and below a position near an exit of the film pasting channel, respectively. Each of the two film cutting apparatuses may include a film cutting knife holder, a film cutting blade, and a film cutting drive component. The film cutting knife holder and the film cutting blade may be fixedly connected. The film cutting blade may be vertically arranged. The film cutting drive component may be disposed on each of the two film pasting bracket bodies and slidably connected with the film cutting knife holder for driving the film cutting knife holder to carry the film cutting blade to horizontally slide along a width direction of the insulating film. The each of the two film cutting apparatuses is used for cutting the insulating film between the bare materials and the film drawing rod pasting the insulating film below the position near the entrance of the film pasting channel after the bare materials pass through the film pasting channel, to complete the film pasting.

In some embodiments, the alternate film pasting device may further include a discharging apparatus. The discharging apparatus may include a discharging driving roller, a discharging driven roller, a discharging slide plate, and a discharging slide plate drive part. The discharging driving roller and the discharging driven roller may be rollable disposed on a side wall of the film pasting bracket body away from the film pasting slide plate. The discharging driving roller may be located below the discharging driven roller. A discharging channel used for transporting film pasting materials out may be formed between the discharging driving roller and the discharging driven roller. The discharging slide plate may be disposed above the discharging driven roller and slidably disposed on the film pasting bracket body in the vertical direction. The discharging driven roller may be rollable disposed at a lower end of the discharging slide plate. A discharging slide plate drive part may be connected with the discharging slide plate to drive the discharging driven roller to move toward or away from the discharging driving roller.

In some embodiments, the alternate film pasting device may further include a material charging apparatus disposed between the material feeding apparatus and the two film feeding apparatuses. The material charging apparatus may include a material charging bracket, a material charging slide plate, a first material charging roller, a second material charging roller, and a material charging slide plate drive part. The material charging bracket may be disposed on the frame. The material charging slide plate may be disposed above the material feeding channel. The material charging slide plate may be slidably disposed on the material charging bracket in a vertical direction. The first material charging roller may be rollable disposed at a lower end of the material charging slide plate. The second material charging roller may be rollable disposed on the material charging bracket. The second feeding roller may be disposed below the first material charging roller. A material charging channel used for transporting the bare materials to the film pasting channel may be formed between the first material charging roller and the second material charging roller. The material charging slide plate drive part may be connected with the material charging slide plate to drive the first material charging roller to move toward or away from the second material charging roller.

The alternate film pasting device comprises the following beneficial effects. When the insulating film is pasted onto the bare materials in the present disclosure, one of the two material pushing mechanisms pushes a part of the bare materials from the material feeding channel to the film pasting channel, and one of the two film feeding apparatuses conveys the insulating film to the part of the bare materials, so that the insulating film is capable of being pasted onto the part of the bare materials. Then the material pushing mechanism moves downward along the vertical direction and resets along the extension direction of the material feeding channel, so that the other of the two material pushing mechanisms pushes the other of the bare materials from the material feeding channel to the film pasting channel, thereby realizing alternate material feeding. After the other of the two material pushing mechanisms pushes the other of the bare materials to the film pasting channel, the other of the two film feeding apparatuses conveys the insulating film to the other of the bare materials, to realize alternate film feeding. According to the alternate film pasting device, alternate material feeding and alternate film feeding can be realized, so that the insulating film can be continuously pasted onto the bare materials one by one, thereby greatly improving the production efficiency.

BRIEF DESCRIPTION OF THE DRAWINGS

The present disclosure is further illustrated by way of exemplary embodiments, which is described in detail with reference to the accompanying drawings. Obviously, the accompanying drawings are only some embodiments of the present disclosure, and other drawings may be obtained from these drawings by those having ordinary skills in the art without creative efforts.

Figure 1:
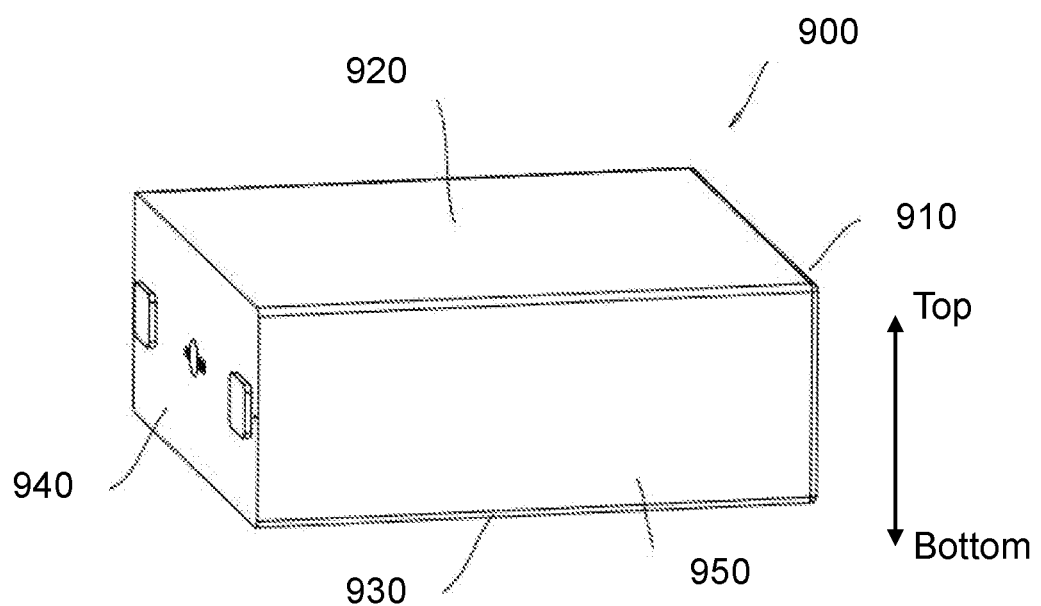
FIG. 1 is a schematic structural diagram illustrating bare materials according to some embodiments of the present disclosure.

The reference signs in accompanying drawings are presented below. 100: Frame; 200: Material feeding apparatus; 210: Base; 220: Half-material rack; 221: Material feeding channel; 230: Material pushing and bearing plate; 240: Material pushing mechanism; 241: Material pushing component; 2411: Material pushing slide plate; 2412: Material pushing part; 24121: Pusher; 24122: Material pushing bracket; 242: Material pushing drive component; 2421: Material pushing drive part; 2422: Lead screw; 2423: Nut; 2424: Material pushing limit block; 243: Material pushing slide rail; 250: Lifting mechanism; 251: Lifting slide plate; 252: Lifting drive part; 253: Lifting slide rail; 260: Transfer mechanism; 261: Transfer drive part; 262: Transfer bracket; 300: Film feeding apparatus; 310: Film releasing mechanism; 311: Film releasing bracket; 312: Film releasing roller; 313: Collecting roller; 314: Transition roller; 320: Film drawing mechanism; 321: Film drawing support; 322: Film drawing slide plate; 323: Film drawing rod; 324: Film drawing drive component; 3241: Film drawing drive part; 3242: Third drive gear; 3243: Fourth drive gear; 3244: Synchronous belt; 3245: Synchronous belt buckle; 325: Film drawing slide rail; 400: Film pasting apparatus; 410: Film pasting bracket; 411: Film pasting bracket body; 412: Film pasting slide plate; 420: Film pasting roller; 430: Film pasting drive part; 440: Film pasting channel; 500: Film cutting apparatus; 510: Film cutting knife holder; 520: Film cutting blade; 530: Film cutting drive component; 600: Discharging apparatus; 610: Discharging driving roller; 620: Discharging driven roller; 630: Discharging slide plate; 640: Discharging slide plate drive part; 650: Discharging channel; 700: Material charging apparatus; 710: Material charging bracket; 720: Material charging slide plate; 730: First material charging roller; 740: Second material charging roller; 750: Material charging slide plate drive part; 760: Material charging channel; 800: Double-layer film; 810: Release film; 820: Insulating film; 900: Bare materials; 910: Bottom surface; 920: Upper large surface; 930: Lower large surface; 940: Top surface; and 950: Narrow side surface.

DETAILED DESCRIPTION

In order to more clearly illustrate the technical problems, the technical solutions, and the beneficial effects of the embodiments of the present disclosure, the present disclosure will be further illustrated by way of exemplary embodiments with reference to the drawings. It should be understood that the specific embodiments described herein are for explaining the present disclosure only and are not intended to limit the present disclosure.

It should be noted that when an element is "fixed to" or "disposed on" another element, which can be understood that the element is directly on the other element or indirectly on the other element. When an element is "connected to" another element, which can be understood that the element is directly connected to the other element or indirectly connected to the other element. The embodiments and features in the embodiments of the present disclosure may be combined with each other without conflict. The present disclosure will be described in detail below by way of embodiments with reference to the accompanying drawings.

It should be understood that the terms the orientations or positional relationships indicated by, for example, "length", "width", "upper", "lower", "front", "back", "left", "right", "vertical", "horizontal", "top", "bottom", "inner", "outer", etc. are based on the orientations or positional relationships illustrated in the drawings. They are only for the convenience of describing the present disclosure and simplifying the description, and do not indicate or imply that a device or element must have a specific position or be constructed and operated in a specific orientation, and therefore should not be construed as limiting the present disclosure.

In addition, the terms "first" and "second" are used for descriptive purposes only and are not understood as indicating or implying relative importance or implicitly indicating the quantity of indicated technical features. Therefore, features defined as "first" and "second" may explicitly or implicitly include one or more of the features. In the description of the present disclosure, the meaning of "plurality" is two or more, unless otherwise clearly and specifically limited.

As recorded in the background, at present, during the manufacturing process of an aluminum-case battery, an insulating film needs to be applied to the outside of the bare battery to achieve electrical isolation. In the related prior art, a film pasting device using a single reciprocating material feeding apparatus and a single reciprocating film feeding apparatus may be used for U-shaped film pasting or film pasting shaped like a Chinese character "回". When the single material feeding apparatus returns to push materials and the single film feeding apparatus returns to draw the film, the film pasting device may be in a state waiting for the materials, which results in low production efficiency of film pasting.

Figure 2:
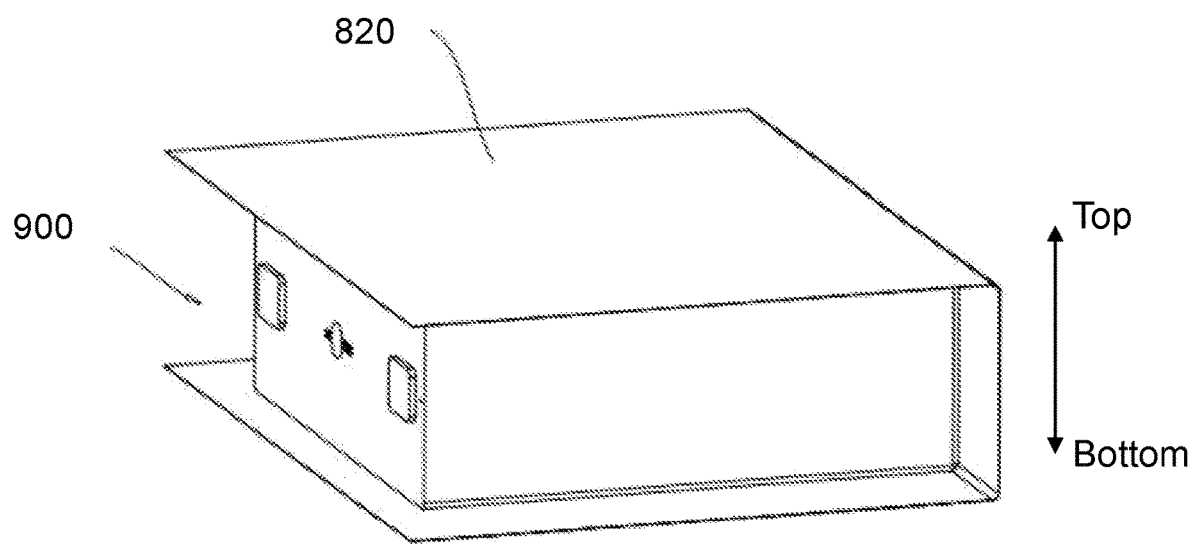
FIG. 2 is a schematic structural diagram illustrating bare materials after U-shaped film pasting according to some embodiments of the present disclosure.

FIG. 1 is a schematic structural diagram illustrating bare materials according to some embodiments of the present disclosure. FIG. 2 is a schematic structural diagram illustrating bare materials after U-shaped film pasting according to some embodiments of the present disclosure.

As illustrated in FIG. 1 and FIG. 2, bare materials 900 may be a square aluminum-case bare battery with a dimension of 54 mm (thickness)×172 mm (width)×97 mm (height). A cover plate of the square aluminum-case bare battery, together with a positive pole, a negative pole, a liquid injection hole, and an explosion-proof window may be arranged at a top. In some embodiments, the bare materials 900 may also be another bare battery with other dimension and case made of other materials. The alternate film pasting device disclosed in the present disclosure may also be applied to wrap a workpiece or a packaging box with soft film or soft paper.

In some embodiments, the bare materials 900 may be pasted with film by adopting a manner of U-shaped film pasting. In some embodiments, the bare materials 900 may also be pasted with film by adopting a manner of film pasting shaped like a Chinese character "回". Merely by way of example, for the U-shaped film pasting, a bottom surface 910 of the bare materials 900 lying flat may be bonded to a middle of an insulating film first, so that a part of the insulating film 820 may be exposed from two sides of the bare materials 900, and then two ends of the insulating film 820 may be spread and pasted toward an upper large surface 920 and a lower large surface 930 adjacent to the bottom surface 910. Then the insulating film 820 adhered to the bare materials 900 and the insulating film 820 not adhered to the bare materials 900 may be cut off, and a film head and a film tail of the insulating film 820 adhered to the bare materials 900 may be rolled, so that the insulating film 820 not adhered to the bare materials 900 may be adhered to a top surface 940. For the film pasting shaped like a Chinese character "回", a narrow side surface 950 of the bare materials 900 lying flat may be bonded to the middle of the film first, and then the two ends of the insulating film 820 may be spread and pasted toward the upper large surface 920 and the lower large surface 930 adjacent to the narrow side surface 950. Then the insulating film 820 adhered to the bare materials 900 and the insulating film 820 not adhered to the bare materials 900 may be cut off, and a film head and a film tail of the insulating film 820 adhered to the bare materials 900 may be rolled, so that the remaining insulating film 820 may be adhered to another narrow side surface 950. The film head in the present disclosure refers to a starting end of the insulating film 820 adhered to the bare materials 900, and the film tail refers to a tail end of the insulating film 820 adhered to the bare materials 900. In addition, the insulating film 820 used in the present disclosure may include a smooth surface and a viscous surface. The viscous surface may be used for being adhered to the bare materials 900.

In some embodiments, the quality and process requirements of film pasting may be represented as follows: film pasting accuracy of ±1 mm (including battery cell positioning accuracy of ±0.5 mm, and film positioning accuracy of ±0.5 mm), film tension of 1.5±0.5 kgf (controlled by a magnetic powder controller), filming pasting pressure of 15±5 kgf, a reserved side film overlap size of 4-5 mm, and no damage, no scratch, no wrinkle, no bubble, or no pollution.

Figure 3:
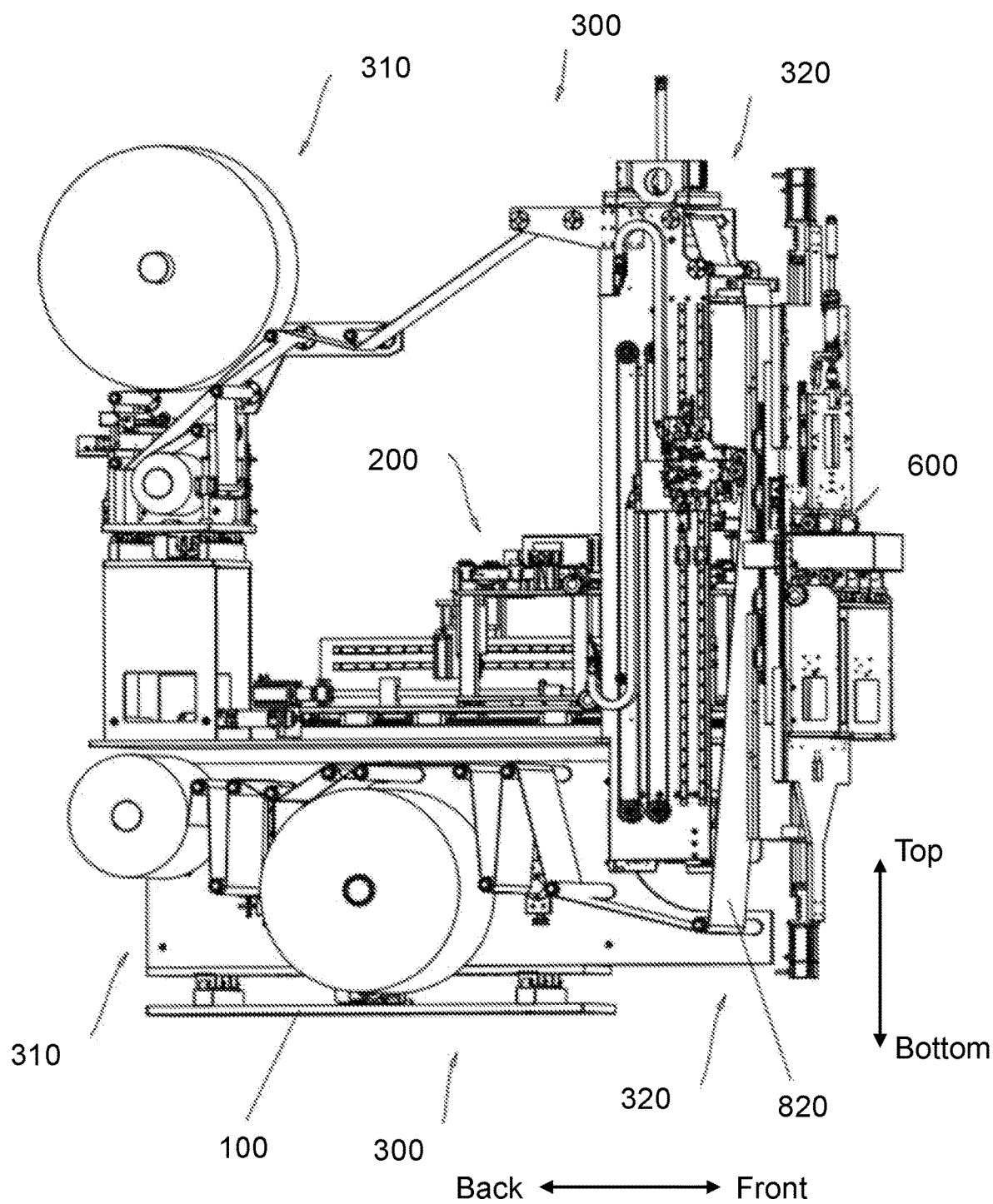
FIG. 3 is schematic diagram illustrating an overall structure of an alternate film pasting device according to some embodiments of the present disclosure.
Figure 4:
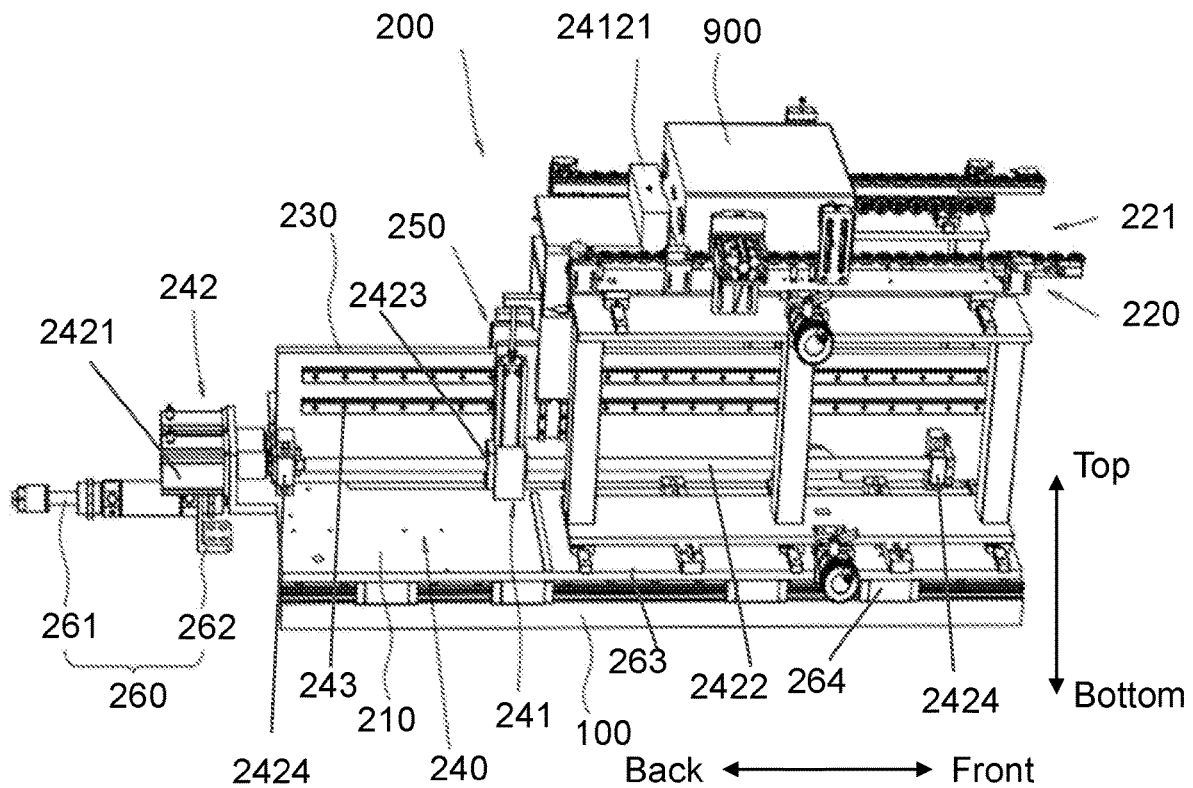
FIG. 4 is a schematic structural diagram illustrating a material feeding apparatus according to some embodiments of the present disclosure.
Figure 5:
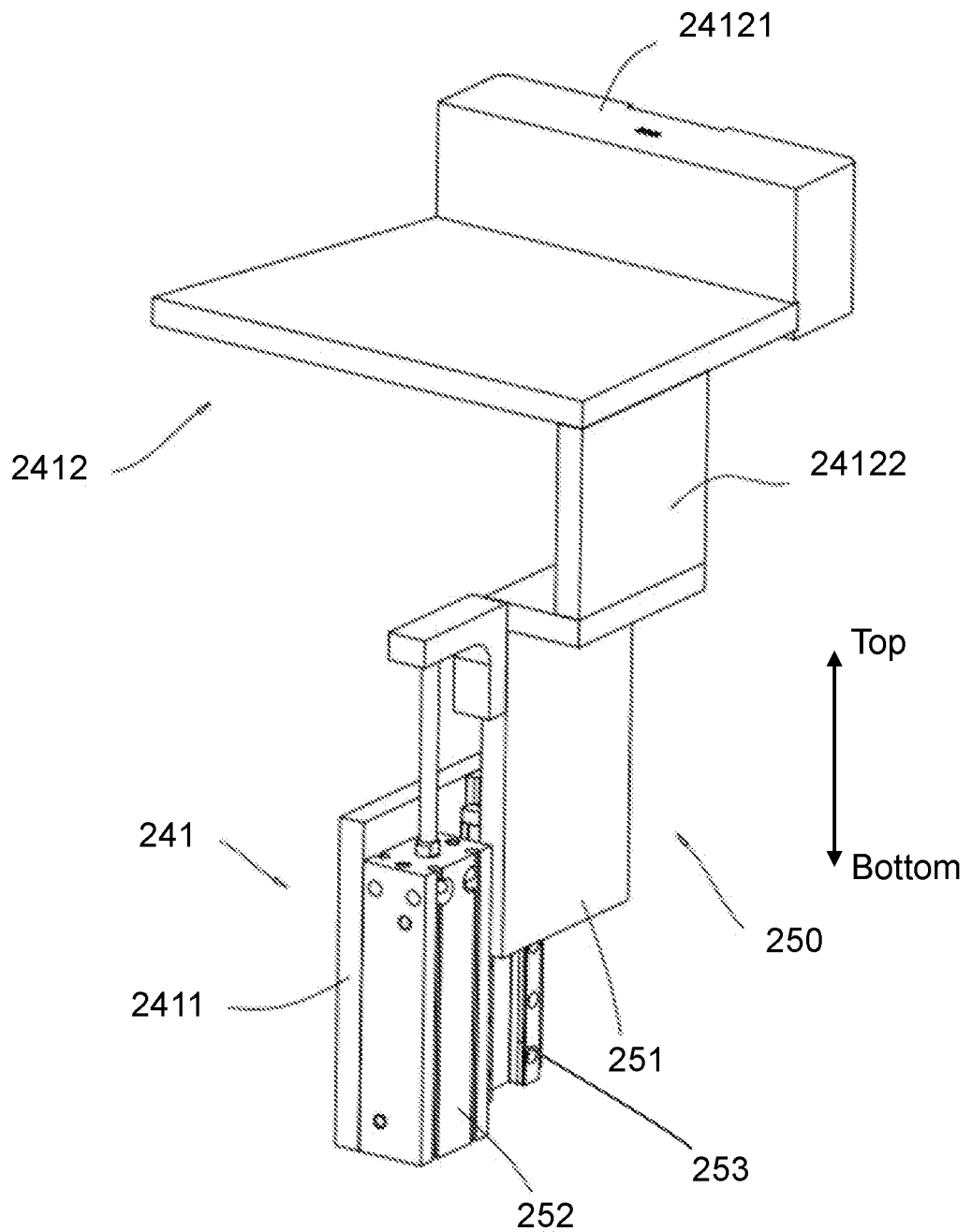
FIG. 5 is a schematic structural diagram illustrating a material pushing mechanism and a lifting mechanism according to some embodiments of the present disclosure.

FIG. 3 is schematic diagram illustrating an overall structure of an alternate film pasting device according to some embodiments of the present disclosure. FIG. 4 is a schematic structural diagram illustrating a material feeding apparatus according to some embodiments of the present disclosure. FIG. 5 is a schematic structural diagram illustrating a material pushing mechanism and a lifting mechanism according to some embodiments of the present disclosure.

As illustrated in FIGS. 3-5, the alternate film pasting device may comprise a frame 100, a material feeding apparatus 200, and two film feeding apparatuses 300. The frame 100 may be provided with a material feeding channel 221 used for conveying the bare materials 900. A film pasting channel 440 used for pasting the insulating film 820 onto the bare materials 900 may be provided at an output end of the material feeding channel 221.

In some embodiments, the material feeding apparatus 200 may be disposed on the frame 100. The material feeding apparatus 200 may comprise two material pushing mechanisms 240 used for pushing the bare materials 900 from the material feeding channel 221 to the film pasting channel 440. The two material pushing mechanisms 240 may both reciprocate along a vertical direction. One of the two material pushing mechanisms 240 may move downward and retract to a preset position after pushing a part of the bare materials 900 to the film pasting channel 440 to avoid the other of the two material pushing mechanisms 240, and the other of the two material pushing mechanisms 240 may push the other of the bare materials 900 to the film pasting channel 440, as illustrated in direction identifiers of FIGS. 3-5. The two film feeding apparatuses 300 may be both disposed on the frame 100 and used for alternately conveying, in turn, the insulating film 820 to the bare materials 900 reaching the film pasting channel 440.

In some embodiments, when the film is pasted onto the bare materials 900, one of the two pushing mechanisms 240 may push a part of the bare materials 900 from the material feeding channel 221 to the film pasting channel 440. One of the two film feeding apparatuses 300 may be used for conveying the insulating film 820 to the part of the bare materials 900, so that the insulating film may be pasted onto the part of the bare materials 900. Then the material pushing mechanism 240 may move downward and reset along an extension direction of the material feeding channel 221, so that the other of the two material pushing mechanisms 240 may push the other of the bare materials 900 from the material feeding channel 221 to the film pasting channel 440, thereby realizing alternate film feeding. After another material pushing mechanism 240 pushes the other bare materials 900 to the film pasting channel 440, another film feeding device 300 transports the insulating film 820 for the other bare materials 900 to achieve alternate film feeding. According to the alternate film pasting device, alternate material feeding and alternate film feeding can be realized, so that the insulating film can be continuously pasted onto the bare materials 900 one by one, thereby greatly improving the production efficiency.

As illustrated in FIG. 4, in some embodiments, the material feeding apparatus 200 may further include a base 210, two half-material racks 220, and a material pushing and bearing plate 230. The base 210 may be disposed on the frame 100. The two half-material racks 220 may be disposed on the base 210 at intervals to form the material feeding channel 221. The material pushing and bearing plate 230 may be disposed on the base 210. An extension direction of the material pushing and bearing plate 230 may be parallel to an extension direction of the material feeding channel 221. In some embodiments, the two material pushing mechanisms 240 may be disposed on two opposite sides of the material pushing and bearing plate 230, respectively.

The two half-material racks 220 is structures used for bearing the bare materials 900. In some embodiments, a roller may be disposed at a top surface of each of the two half-material racks 220, so that two sides of the bare materials 900 may be erected on the two half-material racks 220 to slide, respectively. A sliding friction between the bare materials 900 and the two half-material racks 220 may be converted into a rolling friction, thereby reducing the frictional force.

The two material pushing mechanisms 240 are mechanisms capable of pushing the bare materials 900 to move on the two half-material racks 220 along the extension direction of the material pushing and bearing plate 230. In some embodiments, each of the two material pushing mechanisms 240 may include a material pushing component 241 and a material pushing drive component 242. In some embodiments, a material pushing slide rail 243 parallel to the extension direction of the material pushing and bearing plate 230 may be disposed on the material pushing and bearing plate 230. A material pushing slide block cooperated with the material pushing slide rail 243 may be disposed on the material pushing component 241. The material pushing component 241 may be slidably disposed on the material pushing and bearing plate 230 along the extension direction of the material pushing and bearing plate 230. In some embodiments, an output end of the material pushing component 241 may be used for pushing the bare materials 900 from the material feeding channel 221 to the film pasting channel 440. An output end of the material pushing drive component 242 may be connected with the material pushing component 241 and provide a drive force to drive the material pushing component 241 to slide on the material pushing and bearing plate 230.

In some embodiments, the base 210 may be horizontally disposed on the frame 100. The material pushing and bearing plate 230 may be vertically disposed on the base 210. The two half-material racks 220 may be disposed opposite and connected with the base 210. A gap may be reserved between the two half-material racks 220 to form the material feeding channel 221. The material pushing and bearing plate 230 may be disposed between the two half-material racks 220. An extension direction of the material pushing and bearing plate 230 may be parallel to the extension direction of the material feeding channel 221. The two material pushing mechanisms 240 may be disposed on two opposite sides of the material pushing and bearing plate 230, respectively, to realize alternate material feeding. The material pushing and bearing plate 230 may be provided with the material pushing slide rail 243 parallel to the extension direction of the material pushing and bearing plate 230. The material pushing component 241 may be provided with the material pushing slide block cooperated with the material pushing slide rail 243.

The material pushing drive component 242 provides a source of power for pushing the material pushing mechanisms 240. As illustrated in FIG. 4, in some embodiments, the material pushing drive component 242 may include a material pushing drive part 2421, a lead screw 2422, a nut 2423, and two material pushing limit blocks 2424. The lead screw 2422 may be disposed on one side of the material pushing and bearing plate 230, and an extension direction of the lead screw 2422 may be parallel to the extension direction of the material pushing and bearing plate 230. The two material pushing limit blocks 2424 may be disposed on two ends of the lead screw 2422, respectively. The two ends of the lead screw 2422 may be threaded through the two material pushing limit blocks 2424, and rotatably arranged in the two material pushing limit blocks 2424, respectively. The two material pushing limit blocks 2424 may be fixedly installed on the material pushing and bearing plate 230, respectively. In some embodiments, the nut 2423 may be located between the two material pushing limit blocks 2424. The lead screw 2422 may be threaded through the nut 2423, and the lead screw 2422 and the nut 2423 may be connected in a threaded manner. The nut 2423 may be disposed below the material pushing component 241 and connected with the material pushing component 241. As an output end of the material pushing drive component 242, the nut 2423 may convert a rotation of the lead screw 2422 into a movement along an extension direction of the lead screw 2422. In some embodiments, the material pushing drive part 2421 may be installed on one side of the base 210. The material pushing drive part 2421 may be a drive motor. An output shaft of the material pushing drive part 2421 may be coaxial with and fixedly connected with the lead screw 2422 to drive the nut 2423 and the material pushing component 241 to slide along a length direction of the material pushing slide rail 243, so that the material pushing component 241 may push the bare materials 900 to move in the material feeding channel 221.

The material pushing component 241 is a component capable of pushing the bare materials 900 to move along the material pushing slide rail 243. As illustrated in FIG. 4 and FIG. 5, in some embodiments, the material pushing component 241 may include a material pushing slide plate 2411 and a material pushing part 2412. The material pushing slide plate 2411 may be slidably disposed on the material pushing and bearing plate 230 along the extension direction of the material feeding channel 221. The material pushing drive component 242 may be connected with the material pushing slide plate 2411 and provide a drive force. The material pushing part 2412 may include a pusher 24121 and a material pushing bracket 24122. Referring to direction identifiers in FIG. 5, the pusher 24121 may be disposed above the material pushing slide plate 2411. The material pushing drive component 242 may be used for driving the material pushing slide plate 2411 to slide, so that the pusher 24121 may push the bare materials 900 to move in the material feeding channel 221.

In some embodiments, the material feeding apparatus 200 may further include two lifting mechanisms 250 connected with the two material pushing slide plates 2411, respectively. Each of the two lifting mechanisms 250 may include a lifting slide plate 251 and a lifting drive part 252. The lifting slide plate 251 may be slidably disposed on each of the two material pushing slide plates 2411 in a vertical direction. An output end of the lifting drive part 252 may be connected with the lifting slide plate 251 and provide the drive force. Referring to direction identifiers in FIG. 5, the material pushing bracket 24122 may be disposed above the lifting slide plate 251, and the pusher 24121 may be disposed above the material pushing bracket 24122. The lifting drive part 252 may be used for pushing the lifting slide plate 251 to move vertically to make the pusher 24121 reciprocate in the vertical direction. One of the two pushers 24121 may be driven to move downward by the lifting drive part 252 after one of the two pushers 24121 pushes a part of the bare materials 900 to the film pasting channel 440, so as to avoid the other of the two pushers 24121, and the other of the two pushers 24121 may push the other of the bare materials 900 to the film pasting channel 440.

In the embodiments, the material pushing slide plate 2411 may be vertically arranged, and the material pushing slide plate 2411 may be fixedly connected with the nut 2423. The material pushing slide block may be fixedly connected on a side surface of the material pushing slide plate 2411 close to the material pushing and bearing plate 230. The pusher 24121 may be various shapes capable of pushing the bare materials 900 to move in the material feeding channel 221, such as a rectangle.

In some embodiments, the lifting slide plate 251 may be vertically arranged. A vertical lifting slide rail 253 may be fixedly connected on a side surface of the material pushing slide plate 2411 close to the lifting slide plate 251. A lifting slide block cooperated with the vertical lifting slide rail 253 may be fixedly connected on a side surface of the lifting slide plate 251 close to the material pushing slide plate 2411. In some embodiments, the material pushing bracket 24122 may be fixedly installed between the lifting slide plate 251 and the pusher 24121. The material pushing bracket 24122 may be provided with an avoidance groove to avoid the other of the two material pushing parts 2412, so that the two material pushing parts 2412 may be in different positions at a same time, thereby realizing alternate material feeding. The lifting drive part 252 may adopt a cylinder. In some embodiments, the lifting drive part 252 may be any drive parts capable of realizing linear driving, such as a linear module and a cylinder. In some embodiments, the lifting drive part 252 may be fixedly installed on the material pushing slide plate 2411. An output end of the lifting drive part 252 may be fixedly connected with the lifting slide plate 251 to drive the lifting slide plate 251 to slide on the material pushing slide plate 2411 in the vertical direction.

Merely by way of example, referring to direction identifiers in FIG. 4 and FIG. 5, when the film is pasted onto the bare materials 900, first a part of the bare materials 900 may be placed in the material feeding channel 221, and then the lifting drive part 252 of one of the two material pushing mechanisms 240 may drive the lifting slide plate 251 and the material pushing part 2412 to move upward to a preset material pushing height at which the material pushing part 2412 contacts with the part of bare materials 900. Driven by the material pushing drive component 242 of one of the two material pushing mechanisms 240, the material pushing part 2412 may push the part of the bare materials 900 from the material feeding channel 221 to the film pasting channel 440. When the part of the bare materials 900 moves to the film pasting channel 440, the lifting drive part 252 of one of the two material pushing mechanisms 240 may drive the lifting slide plate 251 and the material pushing part 2412 to move downward until the material pushing part 2412 moves to a preset avoidance height at which the material pushing part 2412 does not hinder the material pushing part 2412 of the other of the two material pushing mechanisms 240 from pushing the other of the bare materials 900 to move in the same material feeding channel 221. Then the material pushing drive component 242 may drive the material pushing part 2412 to move in a direction away from the film pasting channel 440, thereby realizing resetting and preparing for next material pushing. When one of the two material pushing mechanisms 240 pushes the bare materials 900 to move in the material feeding channel 221, the material pushing drive component 242 of the other of the two material pushing mechanisms 240 may drive the other of the material pushing parts 2412 to move along a direction away from the film pasting channel 440 to prepare for pushing the bare materials 900, thereby realizing alternate material feeding.

Figure 6:
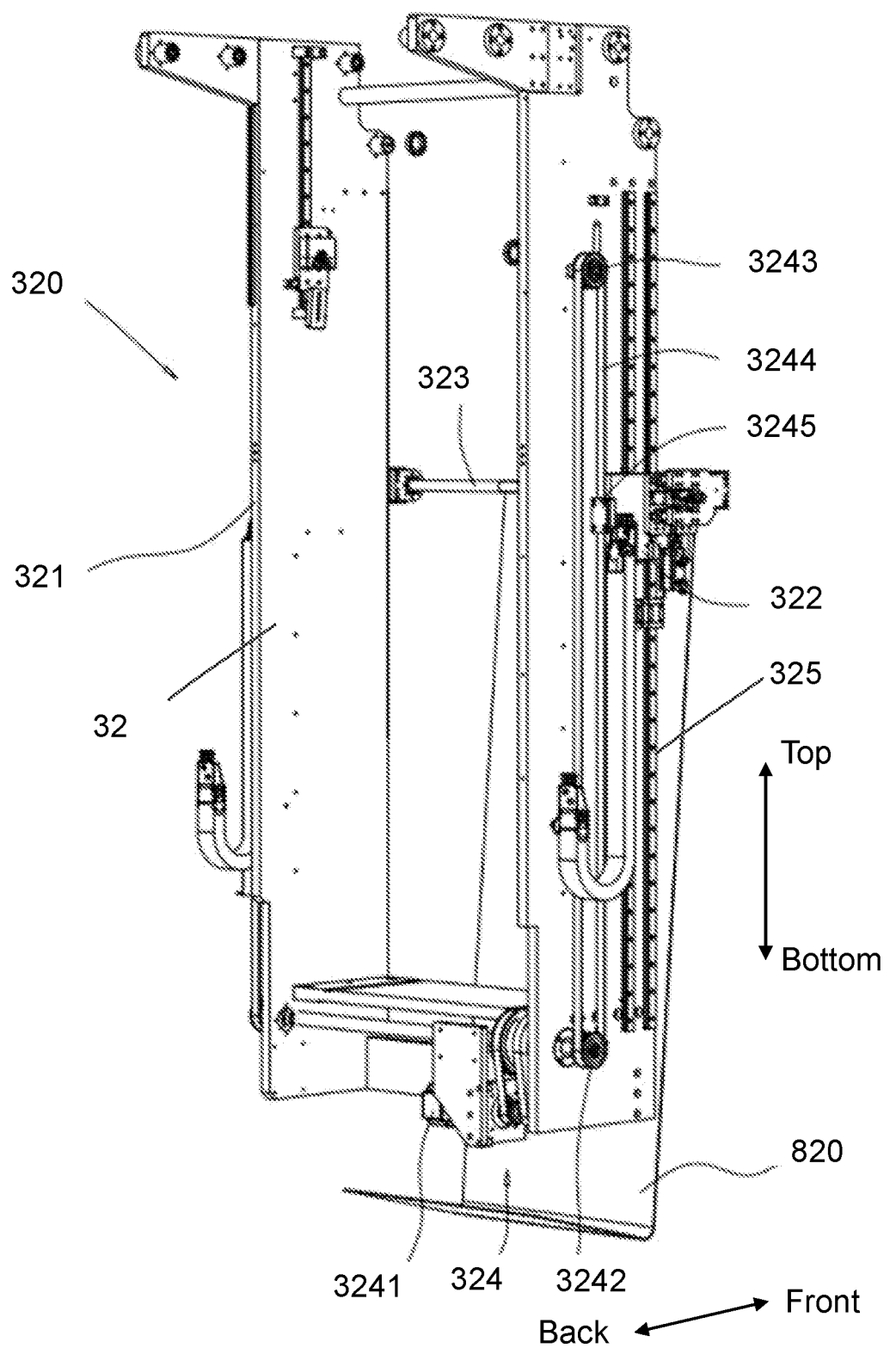
FIG. 6 is a schematic structural diagram illustrating a film drawing mechanism according to some embodiments of the present disclosure.

FIG. 6 is a schematic structural diagram illustrating a film drawing mechanism according to some embodiments of the present disclosure.

The material feeding apparatuses 300 are mechanisms for conveying the insulating film 820 to the film pasting channel 440. As illustrated in FIG. 3 and FIG. 6, referring to direction identifiers, in some embodiments, the two film feeding apparatuses 300 may be symmetrically and vertically arranged along a center line of an entrance of the film pasting channel 440. In some embodiments, each of the two film feeding apparatuses 300 may include a film drawing mechanism 320. The film drawing mechanism 320 may be disposed on the frame 100. The film drawing mechanism 320 may include a film drawing support 321, two film drawing slide plates 322, a film drawing rod 323, and a film drawing drive component 324. The film drawing support 321 may be vertically disposed on the frame 100. The two film drawing slide plates 322 may be slidably disposed on two opposite sides of the film drawing support 321 in the vertical direction. Two ends of the film drawing rod 323 may be respectively connected with the two film drawing slide plates 322. A film head of each of the two insulating films 820 may be adhered to an outer periphery of the film drawing rod 323. An output end of the film drawing drive component 324 may be connected with the two film drawing slide plates 322 and provide the drive force to drive the film drawing rod 323 to move vertically near the entrance of the film pasting channel 440, so that the two insulating films 820 may incline toward the entrance of the film pasting channel 440 in the vertical direction.

Referring to direction identifiers in FIG. 3 and FIG. 6, the film drawing rod 323 located above is capable of driving the film head of each of the two insulating films 820 to move downward and blocking the entrance of the film pasting channel 440 to prepare for film pasting. After the bare materials 900 pass through the film pasting channel 440, the film drawing rod 323 located above is capable of moving upward to remove a film and retracting to a position above and near the entrance of the film pasting channel 440 to continue to paste the insulating film 820 above to prepare for next film drawing. The film drawing rod 323 located below is capable of driving the film head of another insulating film 820 to move upward and blocking the entrance of the film pasting channel 440 to prepare for film pasting. After the other of the bare materials 900 passes through the film pasting channel 440, the film drawing rod 323 located below is capable of moving downward to remove the film and retracting to a position below and near the entrance of the film pasting channel 440 and continue to paste another insulating film 820 below to prepare for the next film drawing.

In the embodiments, the two film drawing brackets 321 may be vertically and symmetrically arranged along the center line of the entrance of the film pasting channel 440. The two film drawing brackets 321 may be designed to be integrally formed.

Referring to direction identifiers in FIG. 3 and FIG. 6, for the film drawing mechanism 320 located below, the insulating film 820 may be inclined forward from bottom to top in a direction from away to close to the film pasting channel 440 to over the film pasting channel 440. For the film drawing mechanism 320 located above, the insulating film 820 may incline forward from top to bottom in a direction from away to close to the film pasting channel 440 to below the film pasting channel 440.

In some embodiments, the film drawing slide plate 322 may be arranged vertically, and film drawing slide rails 325 for the film drawing slide plate 322 to slide vertically may be vertically provided on two side surfaces of the two film drawing brackets 321 away from each other. The film drawing slide rails 325 arranged on the two film drawing brackets 321 may also be designed to be integrally formed. Film drawing slide blocks cooperated with the film drawing slide rails 325 may be fixedly connected on a side surface of the film drawing slide plate 322 close to the film drawing slide rails 325.

The film drawing drive component 324 may be used for driving the film drawing rod to vertically move. As illustrated in FIG. 6, referring to direction identifiers in FIG. 6, in some embodiments, the film drawing drive component 324 may include a film drawing drive part 3241, a first drive gear, a drive synchronous belt, a second drive gear, a transmission shaft, two third drive gears 3242, two fourth drive gears 3243, two synchronous belts 3244, and two synchronous belt buckles 3245. The film drawing drive part 3241 may be installed on the film drawing support 321. In this embodiment, the film drawing drive part 3241 may be a drive motor. The first drive gear may be coaxial with and fixedly connected with an output end of the film drawing drive part 3241. The transmission shaft may be horizontally arranged on one side of the first drive gear. The transmission shaft may be threaded through the second drive gear and fixedly connected with the second drive gear. Two ends of the transmission shaft may pass through two sides of the film drawing support 321. The two third drive gears 3242 may be installed at the two ends of the transmission shaft, respectively. The drive synchronous belt may be arranged between the first drive gear and the second drive gear, and mesh with the first drive gear and the second drive gear, respectively. The two fourth drive gears 3243 may be rotatably provided on the film drawing support 321. For the film drawing mechanism 320 located above, the two fourth drive gears 3243 may be correspondingly provided below the two third drive gears 3242, respectively. For the film drawing mechanism 320 located below, the two fourth drive gears 3243 may be correspondingly provided above the two third drive gears 3242, respectively. One of the two synchronous belts 3244 may be disposed between one of the two third drive gears 3242 and one of the two fourth drive gears 3243, and mesh with one of the two third drive gears 3242 and one of the two fourth drive gears 3243, respectively. The other of the two synchronous belts 3244 may be disposed between the other of the two third drive gears 3242 and the other of the fourth drive gears 3243, and mesh with the other of the two third drive gears 3242 and the other of the fourth drive gears 3243, respectively. In some embodiments, one of the two synchronous belt buckles 3245 may be fixedly connected with one of the two film drawing slide plates 322 and one of the two synchronous belts 3244. The other of the two synchronous belt buckles 3245 may be fixedly connected with the other of the two film drawing slide plates 322 and the other of the two synchronous belts 3244. Two synchronous belt buckles 3245 may form the output end of the film drawing drive component 324.

Merely by way of example, the film drawing drive part 3241 may drive the first drive gear to rotate to drive the transmission shaft to rotate, thereby driving the two synchronous belts 3244 to rotate, and then driving the two film drawing slide plates 322 to move vertically through the two synchronous belt buckles 3245, so that the film drawing rod 323 may move vertically. For the film feeding apparatus 300 located below, first the film head of the insulating film 820 may be adhered to the film drawing rod 323, and then the film head of the insulating film 820 may be driven by the film drawing rod 323 to move to a position above the bare materials 900. As the bare materials 900 continuously move into the film pasting channel 440, a middle position of the insulating film 820 may contact the bottom surface 910 of the bare materials 900 to perform film pasting. Then the film drawing drive component 324 may drive the film head of the insulating film 820 to move downward by driving the film drawing rod 323, so that the remaining insulating film 820 may contact the upper large surface 920 and the lower large surface 930 of the bare materials 900 to perform film pasting. In this case, as the bare materials 900 continue to move, the film head of the insulating film 820 may be separated from the film drawing rod 323. Then the film drawing drive component 324 may drive the film drawing rod 323 to move downward until the film drawing rod 323 is adhered to the inclined insulating film 820 located below the film pasting channel 440 to prepare for the next film feeding.

Merely by way of example, for the film feeding apparatus 300 located above, first the film head of the insulating film 820 may be adhered to the outer periphery of the film drawing rod 323, and then the film head of the insulating film 820 may be driven by the film drawing rod 323 to move to a position below the bare materials 900. As the bare materials 900 continuously move toward the film pasting channel 440, the middle position of the insulating film 820 may contact the bottom surface 910 of the bare materials 900 to perform film pasting. Then the film drawing drive component 324 may drive the film head of the insulating film 820 to move upward by driving the film drawing rod 323, so that the remaining insulating film 820 may contact the upper large surface 920 and the lower large surface 930 of the bare materials 900 to perform film pasting. In this case, as the bare materials 900 continues to move, the film head of the insulating film 820 may be separated from the film drawing rod 323. Then the film drawing drive component 324 may drive the film drawing rod 323 to move upward until the film drawing rod 323 is adhered to the inclined insulating film 820 located above the film pasting channel 440 to prepare for the next film feeding.

Figure 7:
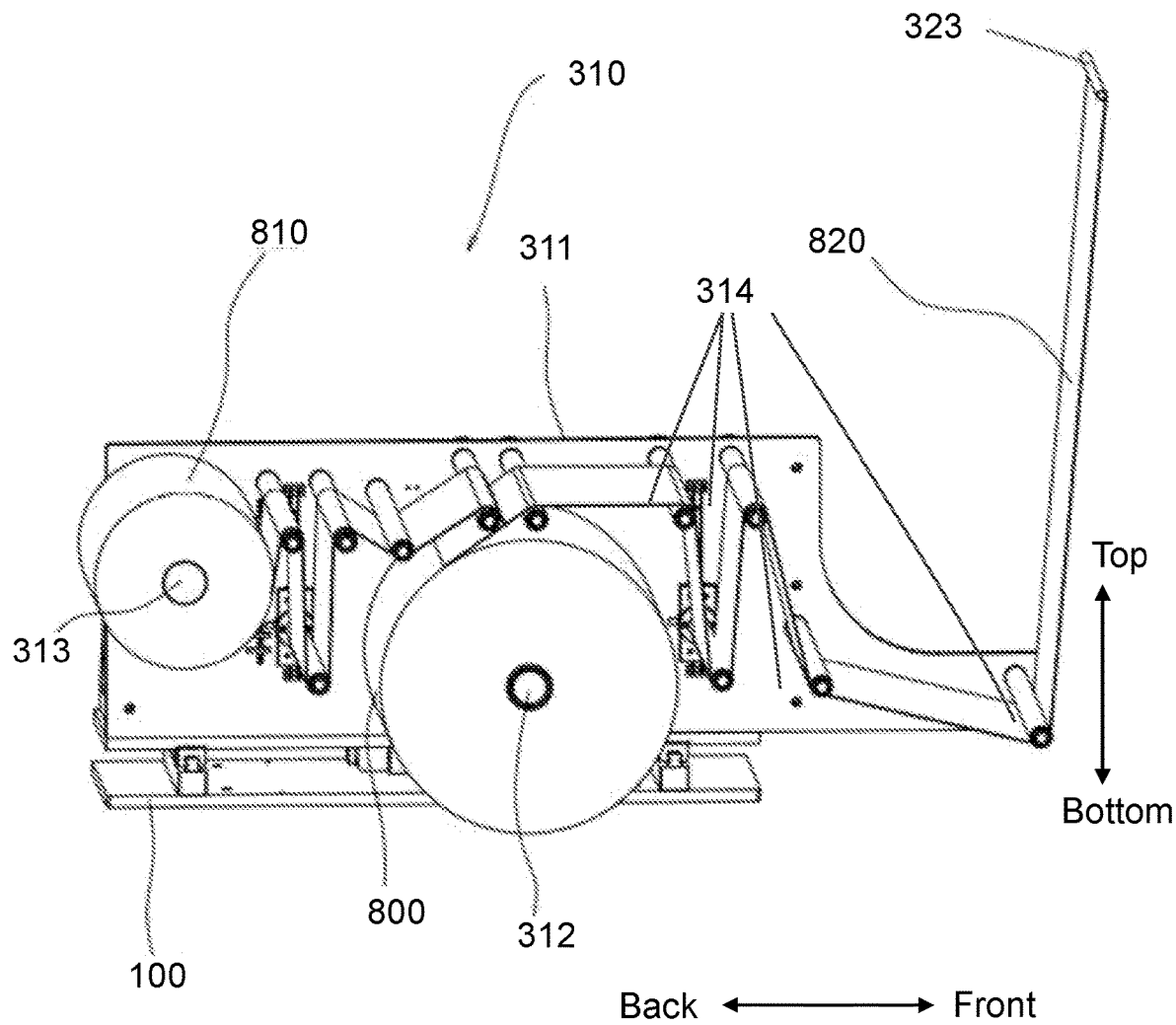
FIG. 7 is a schematic structural diagram illustrating a film releasing mechanism according to some embodiments of the present disclosure.

FIG. 7 is a schematic structural diagram illustrating a film releasing mechanism according to some embodiments of the present disclosure.

As illustrated in FIG. 7, in some embodiments, each of the two film feeding apparatuses 300 may further include a film releasing mechanism 310. The film releasing mechanism 310 may be disposed on one side of the film drawing mechanism 320. The film releasing mechanism 310 is a mechanism used for separating the insulating film 820 from a release film 810. The film releasing mechanism 310 may include a film releasing bracket 311, a film releasing roller 312, and a collecting roller 313. The film releasing bracket 311 may be disposed on the frame 100. The film releasing roller 312 and the collecting roller 313 may be both disposed on the film releasing bracket 311. The film releasing roller 312 may support a rolled double-layer film 800. The double-layer film 800 may include the insulating film 820 and the release film 810. The insulating film 820 may be drawn by the film drawing rod 323 to separate the insulating film 820 from the release film 810. The collecting roller 313 may be used for rolling the release film 810 to collect the release film 810.

In some embodiments, two film releasing mechanisms 310 may be provided. One of the two film releasing mechanisms 310 may be located above the other of the two film releasing mechanisms 310. The two film releasing mechanisms 310 may be arranged on sides of the two film drawing mechanisms 320 away from the film pasting channel 440. The film releasing bracket 311 may be vertically arranged on the frame 100. The film releasing roller 312 may be fixedly installed on the film releasing bracket 311. A supporting roller may be provided in an inner ring of the rolled double-layer film 800. The film releasing roller 312 may be sleeved with the supporting roller, and the supporting roller may be rotatably arranged on the film releasing roller 312. The collecting roller 313 may be arranged on a side of the film releasing roller 312 away from the film drawing rod 323 and rotatably arranged on the film releasing bracket 311. One or more transition rollers 314 may be provided between the film releasing roller 312 and the film drawing rod 323. The one or more transition rollers 314 may be disposed on the film releasing bracket 311 for transitioning the insulating film 820 from the film releasing roller 312 to the film drawing rod 323.

A transfer mechanism 260 is a mechanism capable of driving the material feeding apparatus 200 to avoid film pasting. As illustrated in FIG. 3 and FIG. 4, in some preferred embodiments, the material feeding apparatus 200 may further include the transfer mechanism 260. The transfer mechanism 260 may include a transfer drive part 261 and a transfer bracket 262. The transfer bracket 262 may be fixed on the frame 100. The transfer drive part 261 may be fixed on the transfer bracket 262. A movable end of the transfer drive part 261 may be connected with the base 210 to drive the base 210 to slide on the frame 100 along an extension direction of the material feeding channel 221.

In some embodiments, a transfer slide rail may be arranged horizontally between the base 210 and the frame 100. The transfer slide rail may be fixedly connected with the frame 100, and an extension direction of the transfer slide rail may be parallel to the extension direction of the material feeding channel 221. A transfer slide block may be provided between the base 210 and the frame 100. The transfer slide block may be slidably disposed on the transfer slide rail and fixedly connected with a lower end surface of the base 210. The transfer drive part 261 may be any drive mechanisms capable of realizing linear driving, such as a linear module and a cylinder. The purpose of providing the transfer mechanism 260 is to enable the material feeding apparatus 200 to retract to avoid the two film drawing rods 323 when the two film drawing rods move vertically, so that the two film drawing rods 323 can move vertically normally, and the film drawing rod 323 and the material feeding apparatus 200 can be prevented from interfering with each other, thereby ensuring the normal film feeding operation.

Figure 8:
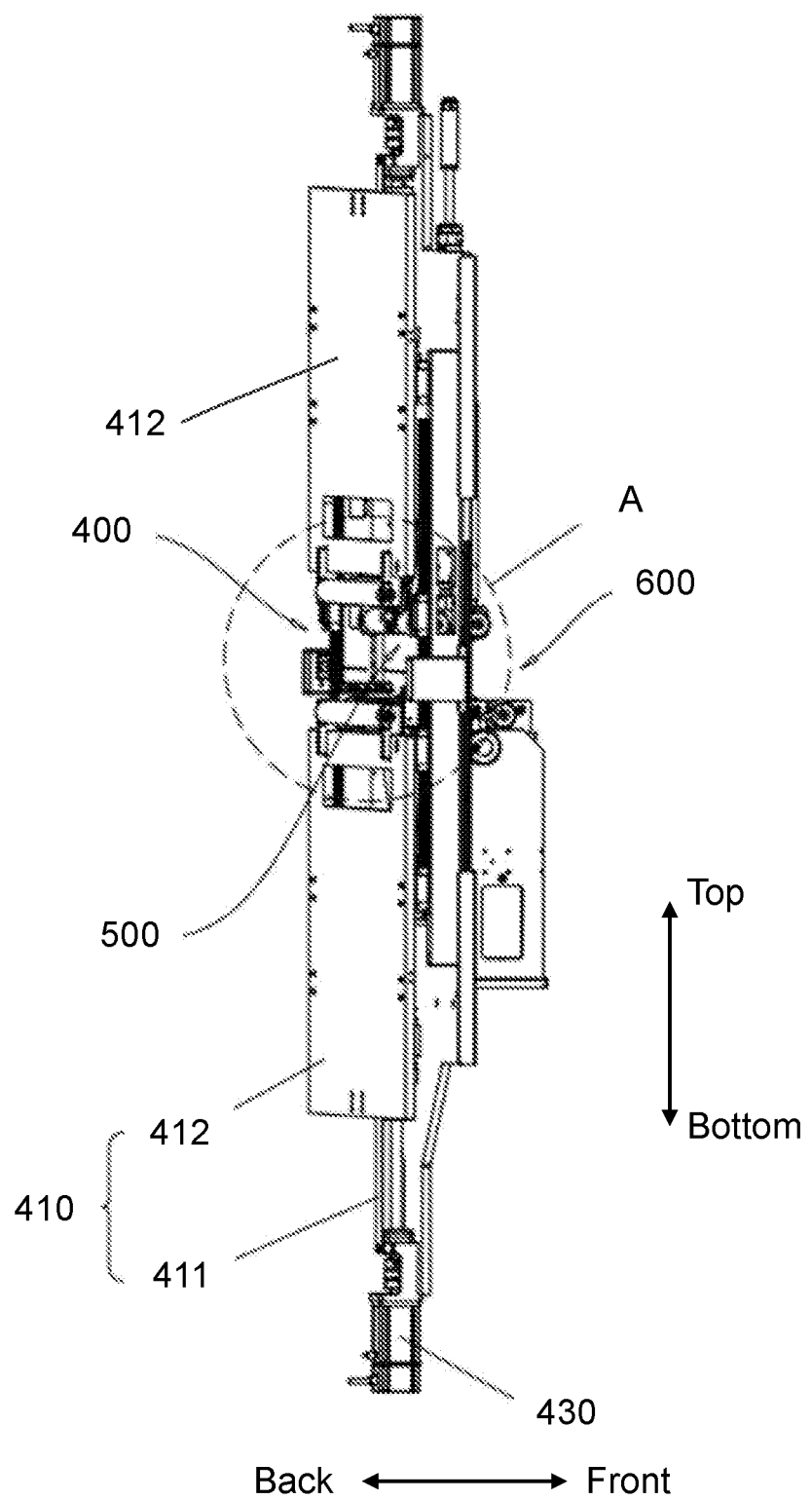
FIG. 8 is a schematic diagram illustrating an assembly of a film pasting apparatus, a film cutting apparatus, and a discharging apparatus according to some embodiments of the present disclosure.
Figure 9:
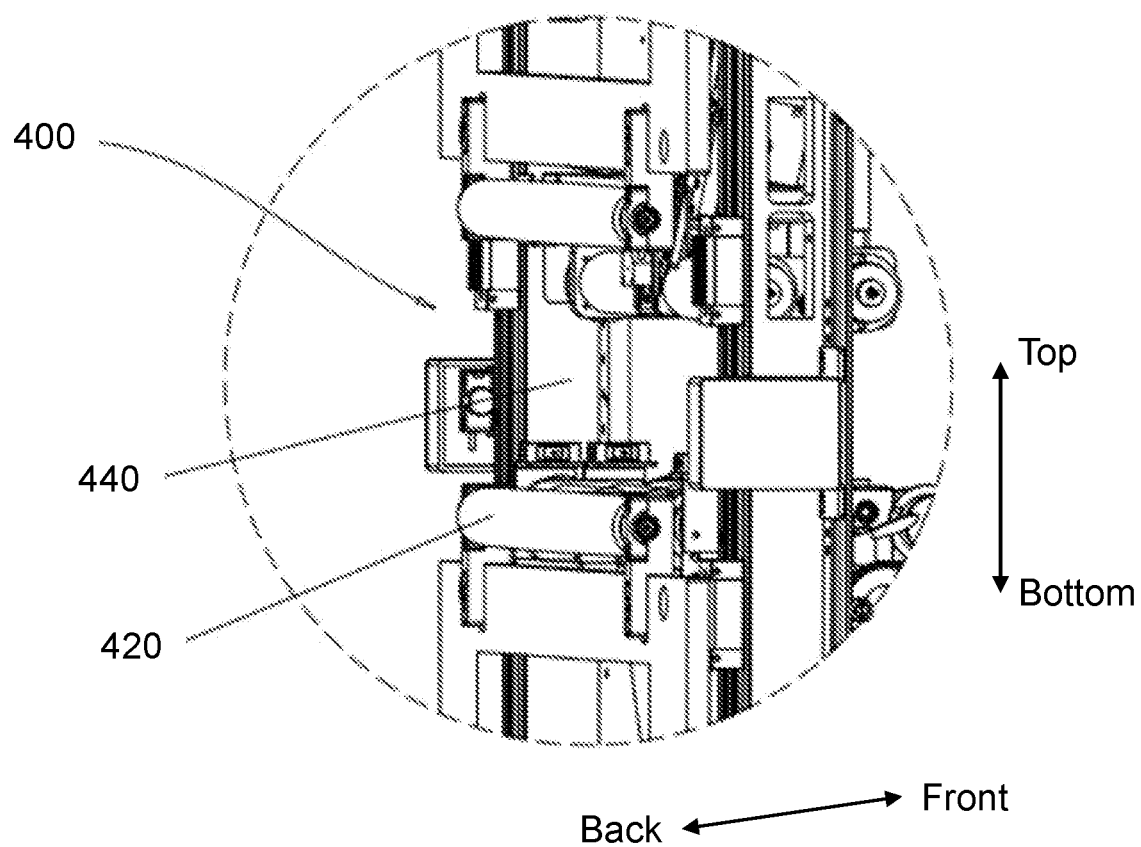
FIG. 9 is an enlarged schematic structural diagram of location A in FIG. 8.

FIG. 8 is a schematic diagram illustrating an assembly of a film pasting apparatus, a film cutting apparatus, and a discharging apparatus according to some embodiments of the present disclosure. FIG. 9 is an enlarged schematic structural diagram of location A in FIG. 8.

As illustrated in FIG. 3, FIG. 8, and FIG. 9, in some embodiments, the alternate film pasting device may further include a film pasting apparatus 400 located at a side of each of the two film feeding apparatuses 300 away from the material feeding apparatus 200 and disposed on the frame 100. The film pasting apparatus 400 is a mechanism capable of pasting the insulating film 820 onto the bare materials 900. In some embodiments, the film pasting apparatus 400 may include a film pasting bracket 410 and two film pasting rollers 420. The film pasting bracket 410 may include a film pasting bracket body 411 and two film pasting slide plates 412. The film pasting bracket body 411 may be disposed on the frame 100. The two film pasting slide plates 412 may be slidably disposed on a side wall of the film pasting bracket body 411 close to the material feeding apparatus 200 at an opposite position in the vertical direction. The two film pasting rollers 420 may be rollable disposed at ends of the two film pasting slide plates 412 close to each other. The film pasting channel 440 used for pasting the insulating film 820 onto the bare materials 900 may be formed between the two film pasting rollers 420. The film pasting apparatus 400 may further include two film pasting drive parts 430 which are connected with the two film pasting slide plates 412, respectively, to drive the two film pasting rollers 420 to move toward or away from each other.

In some embodiments, the film pasting bracket body 411 may be vertically installed on the frame 100. The two film pasting slide plates 412 may be vertically arranged. The film pasting bracket body 411 may be provided with film pasting slide rails for the two film pasting slide plates 412 to slide. The film pasting slide rails may be vertically arranged. Side surfaces of the two film pasting slide plates 412 close to the film pasting bracket body 411 may be fixedly connected with film pasting slide blocks cooperated with the film pasting slide rails, so that the two film pasting slide plates 412 may slide along the film pasting slide rails. The two film pasting drive parts 430 may be both arranged on the film pasting bracket body 411. In some embodiments, the two film pasting drive parts 430 may be any drive parts capable of realizing linear driving, such as a linear module and a cylinder. Output ends of the two film pasting drive parts 430 may be connected with the two film pasting slide plates 412 to drive the two film pasting rollers 420 to move toward or away from each other.

Merely by way of example, when the bare materials 900 move to the film pasting channel 440 and just contact the forward inclined insulating film 820 drawn from bottom to top, the two film pasting rollers 420 located below may rise to press the insulating film 820 onto a lower edge of an intersecting side between a lower large surface 930 and a bottom surface 910 of the bare materials 900. As the bare materials 900 continue to move into the film pasting channel 440, the two film pasting rollers 420 located below may continue to rise to roll and press the insulating film 820 onto the bottom surface 910 of the bare materials 900 till an upper edge of an intersecting side between the bottom surface 910 and the upper large surface 920, and then two film pasting rollers 420 located below may retract to the lower large surface 930. As the bare materials 900 continue to move into the film pasting channel 440, the two film pasting rollers 420 located above may descend to roll and press the insulating film 820 of the film drawing rod 323 onto the upper large surface 920 of the bare materials 900, and the two film pasting rollers 420 located below may roll and press the other insulating film 820 onto the lower large surface 930 of the bare materials 900. The above design reduces the possibility of bubbles being generated when the insulating film 820 is pasted onto the bare materials 900, thereby ensuring a qualification rate of film pasting.

In addition, when the film is pasted onto the irregular bare materials 900, the two film pasting drive parts 430 may drive the two film pasting rollers 420 to move close to or away from each other in real time, respectively, so that the two film pasting rollers 420 may always keep a state against the upper large surface 920 and the lower large surface 930 of the irregular bare materials 900, thereby pasting the film onto the irregular bare materials 900, reducing the possibility of bubbles being generated when the insulating film 820 is pasted onto the bare materials 900, and ensuring the qualification rate of film pasting.

In some embodiments, the alternate film pasting device may further include a dust removal and electrostatic removal mechanism disposed near the two film pasting rollers 420. The dust removal and electrostatic removal mechanism may perform dust removal and electrostatic removal in various manners, such as humid air spraying, electrostatic brushing, ultraviolet irradiation, etc. In some embodiments, the dust removal and electrostatic removal mechanism may be an ionization blower which produces a large number of positive and negative ions to neutralize static electricity in the air, to achieve the effect of eliminating the static electricity and reducing dust adsorption.

By removing dust and static electricity during the film pasting process, the dust and the static electricity can be prevented from affecting pasting of the insulating film 820, thereby improving the quality of film pasting.

Figure 10:
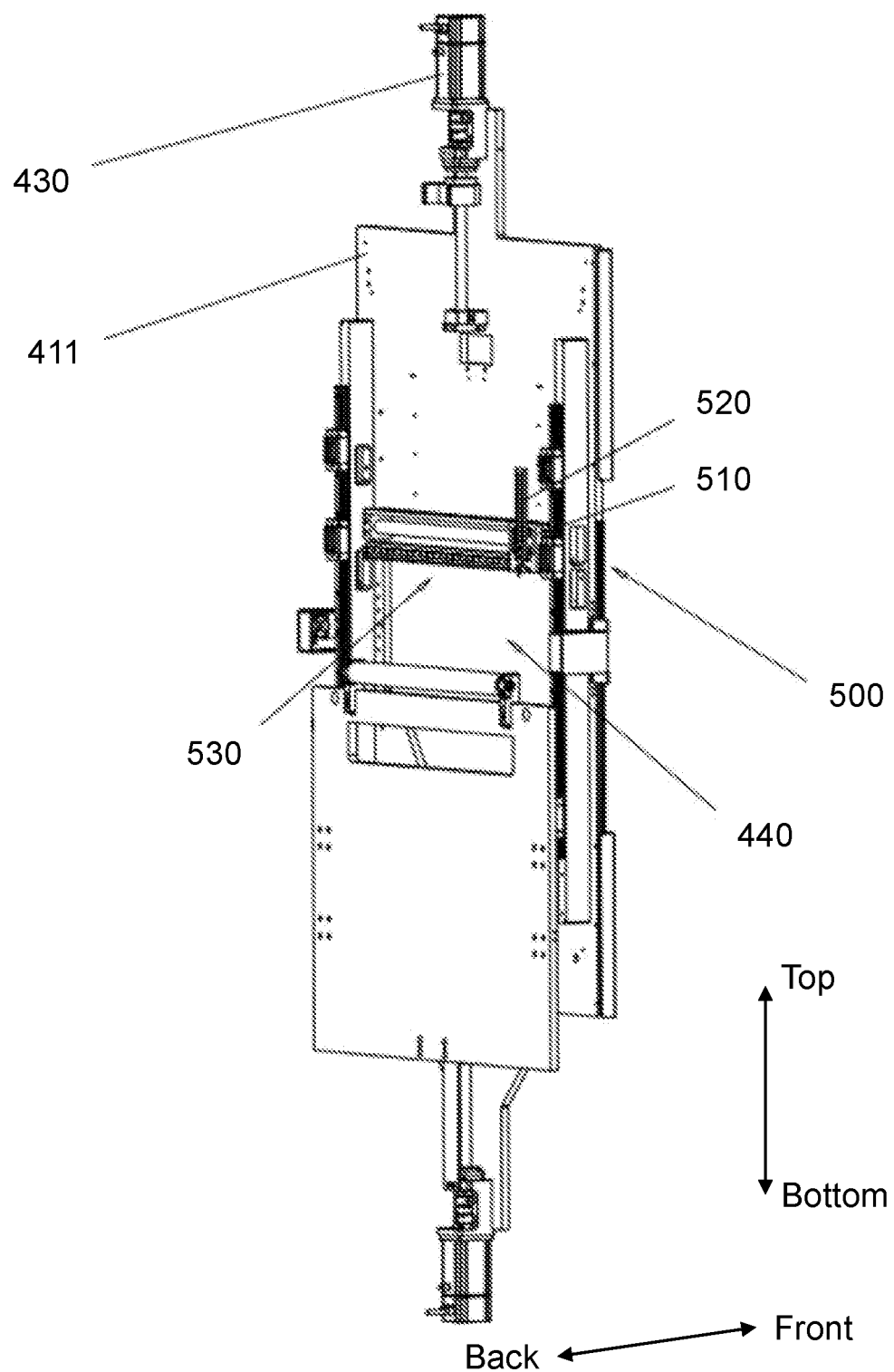
FIG. 10 is a schematic structural diagram illustrating a film cutting apparatus according to some embodiments of the present disclosure.

FIG. 10 is a schematic structural diagram illustrating a film cutting apparatus according to some embodiments of the present disclosure.

As illustrated in FIG. 3 and FIG. 10, referring to direction identifiers in FIG. 10, the alternate film pasting device may further include two film cutting apparatuses 500. The two film cutting apparatuses 500 may be disposed on the two film pasting bracket bodies 411 and located above and below a position near an exit of the film pasting channel 440, respectively.

The two film cutting apparatuses 500 are apparatuses used for cutting the insulating film 820 completing film pasting. In some embodiments, each of the two film cutting apparatuses 500 may include a film cutting knife holder 510, a film cutting blade 520, and a film cutting drive component 530. The film cutting knife holder 510 and the film cutting blade 520 may be fixedly connected. The film cutting blade 520 may be vertically arranged. The film cutting knife holder 510 may be disposed on a side of each of the two film pasting rollers 420 away from each of the two film feeding apparatuses 300. The film cutting drive component 530 may be disposed on each of the two film pasting bracket bodies 411 and slidably connected with the film cutting knife holder 510 for driving the film cutting knife holder 510 to carry the film cutting blade 520 to horizontally slide along a width direction of the insulating film 820. After the bare materials 900 pass through the film pasting channel 440, the two film cutting apparatuses 500 may be used for cutting, at a preset position, the insulating film 820 between the bare materials 900 and the film drawing rod 323 pasting the insulating film 820 below the position near the entrance of the film pasting channel 440 where the film drawing rod 323 is retracted, to complete the film pasting.

The length direction of the insulating film 820 may be the extension direction, and the width direction of the insulating film 820 may be a direction perpendicular to the extension direction. In some embodiments, the film cutting apparatuses 500 may be disposed on a side of each of the two film pasting rollers 420 away from each of the two film feeding apparatuses 300, respectively. The film cutting drive component 530 may include two film cutting slide rails, a lead screw, a nut, and a film cutting drive part. The lead screw may be horizontally and rotatably arranged on the film pasting bracket body 411 and parallel to the width direction of the insulation film 820. The two film cutting slide rails may be both horizontally and fixedly installed on the two film pasting bracket bodies 411, and the lead screw may be horizontally arranged between the two film cutting slide rails. The nut may be threaded through the lead screw and threaded with the lead screw. The film cutting knife holder 510 may be fixedly connected with the nut. The film cutting blade 520 may be arranged toward a direction of the film pasting bracket bodies 411 close to the film pasting slide plates 412, and a blade of the film cutting blade 520 may be arranged toward the film pasting channel 440. The film cutting drive part may be a motor. An output end of the motor may be coaxial with and fixedly connected with the lead screw to drive the lead screw to rotate and then drive the film cutting knife holder 510 and the film cutting blade 520 to move along the width direction of the insulating film 820 to cut off the insulating film 820.

Figure 11:
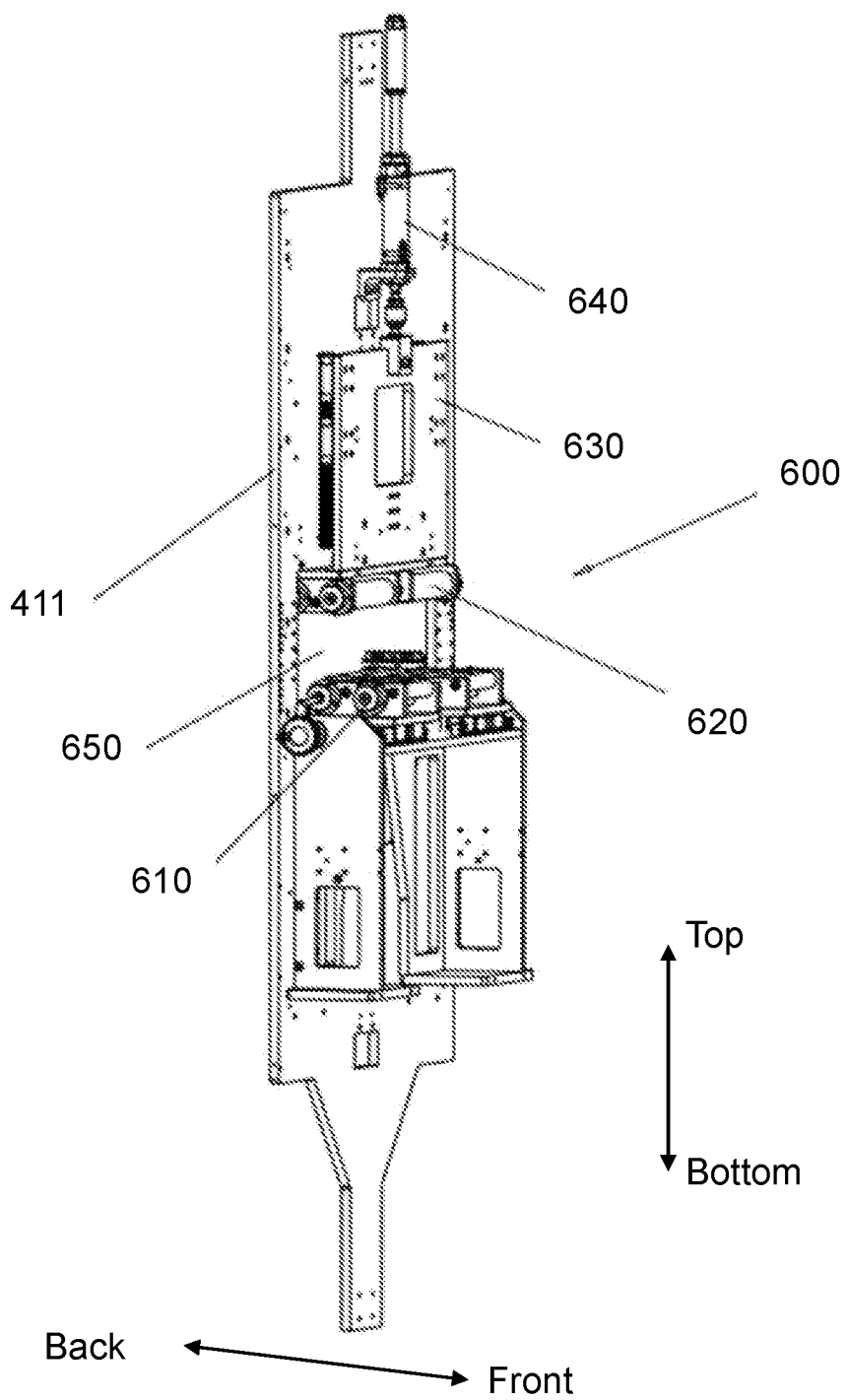
FIG. 11 is a schematic structural diagram illustrating a discharging apparatus according to some embodiments of the present disclosure.

FIG. 11 is a schematic structural diagram illustrating a discharging apparatus according to some embodiments of the present disclosure.

As illustrated in FIG. 3 and FIG. 11, the alternate film pasting device may further include a discharging apparatus 600. The discharging apparatus 600 is an apparatus used for removing film pasting material completing film pasting out of the alternate film pasting device. The discharging apparatus 600 may include a discharging driving roller 610, a discharging driven roller 620, a discharging slide plate 630, and a discharging slide plate drive part 640. Referring to direction identifiers in FIG. 11, the discharging driving roller 610 and the discharging driven roller 620 may be rollable disposed on a side wall of the film pasting bracket body 411 away from the film pasting slide plate 412. The discharging driving roller 610 may be located below the discharging driven roller. A discharging channel 650 used for transporting film pasting materials out may be formed between the discharging driving roller 610 and the discharging driven roller 620. The discharging slide plate 630 may be disposed above the discharging driven roller 620 and slidably disposed on the film pasting bracket body 411 in the vertical direction. The discharging driven roller 620 may be rollable disposed at a lower end of the discharging slide plate 630. The discharging slide plate drive part 640 may be connected with the discharging slide plate 630 and provide a drive force to drive the discharging driven roller 620 to move toward or away from the discharging driving roller 610.

In some embodiments, a discharging lifting slide rail and a discharging lifting slide block may be provided between the discharging slide plate 630 and the film pasting bracket body 411. The discharging lifting slide rail may be vertically arranged and fixedly connected with the film pasting bracket body 411. The discharging lifting slide block may be fixedly connected on a side wall of the discharging slide plate 630. In some embodiments, the discharging slide plate drive part 640 may be any drive parts capable of realizing linear driving, such as a linear module and a cylinder. Referring to direction identifiers in FIG. 11, in some embodiments, an output shaft of the discharging slide plate drive part 640 may be connected with an upper end of the discharging slide plate 630 to drive the discharging driven roller 620 to move vertically, so as to facilitate position limiting of the film pasting material conveyed to the discharging channel 650. The discharging apparatus 600 may be provided to drive the film pasting material to move in a direction away from the film pasting channel 440, so as to push the film pasting material into a next station to complete subsequent operations.

Figure 12:
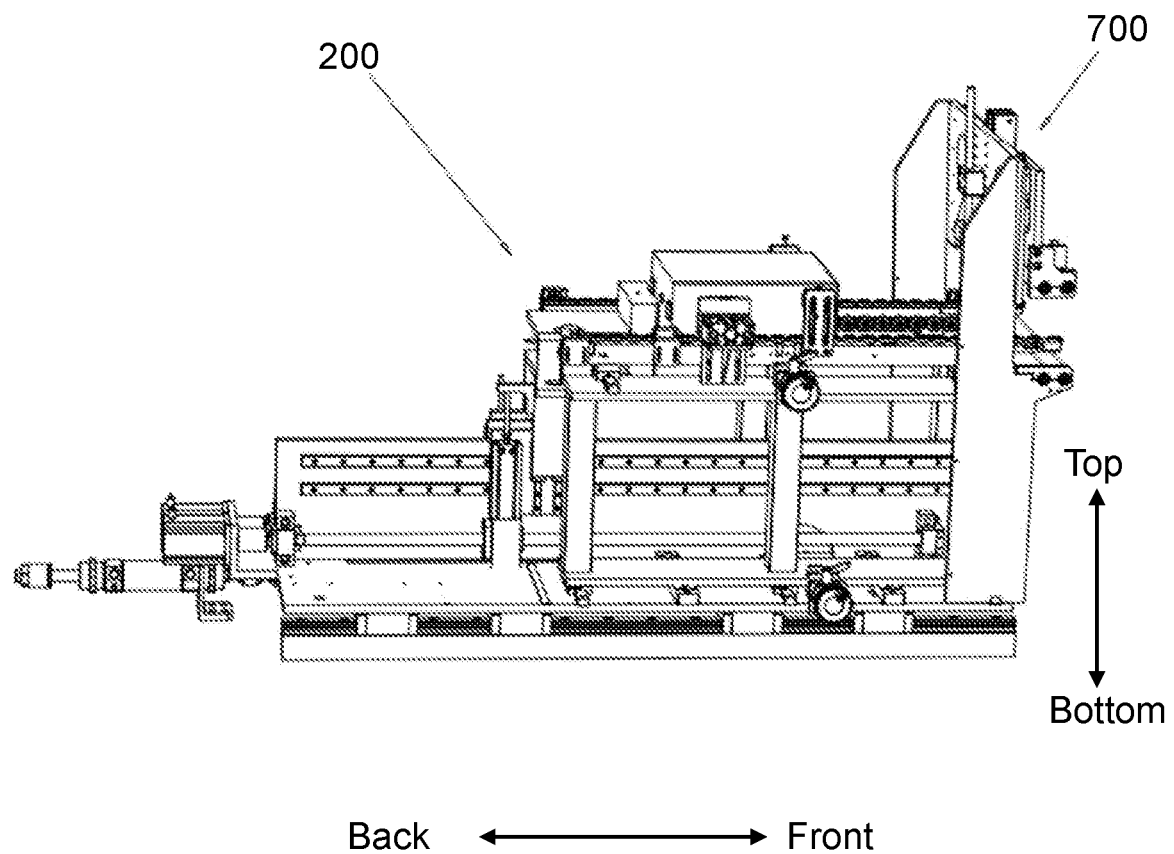
FIG. 12 is a schematic diagram illustrating an assembly of a material feeding apparatus and a material charging apparatus according to some embodiments of the present disclosure.
Figure 13:
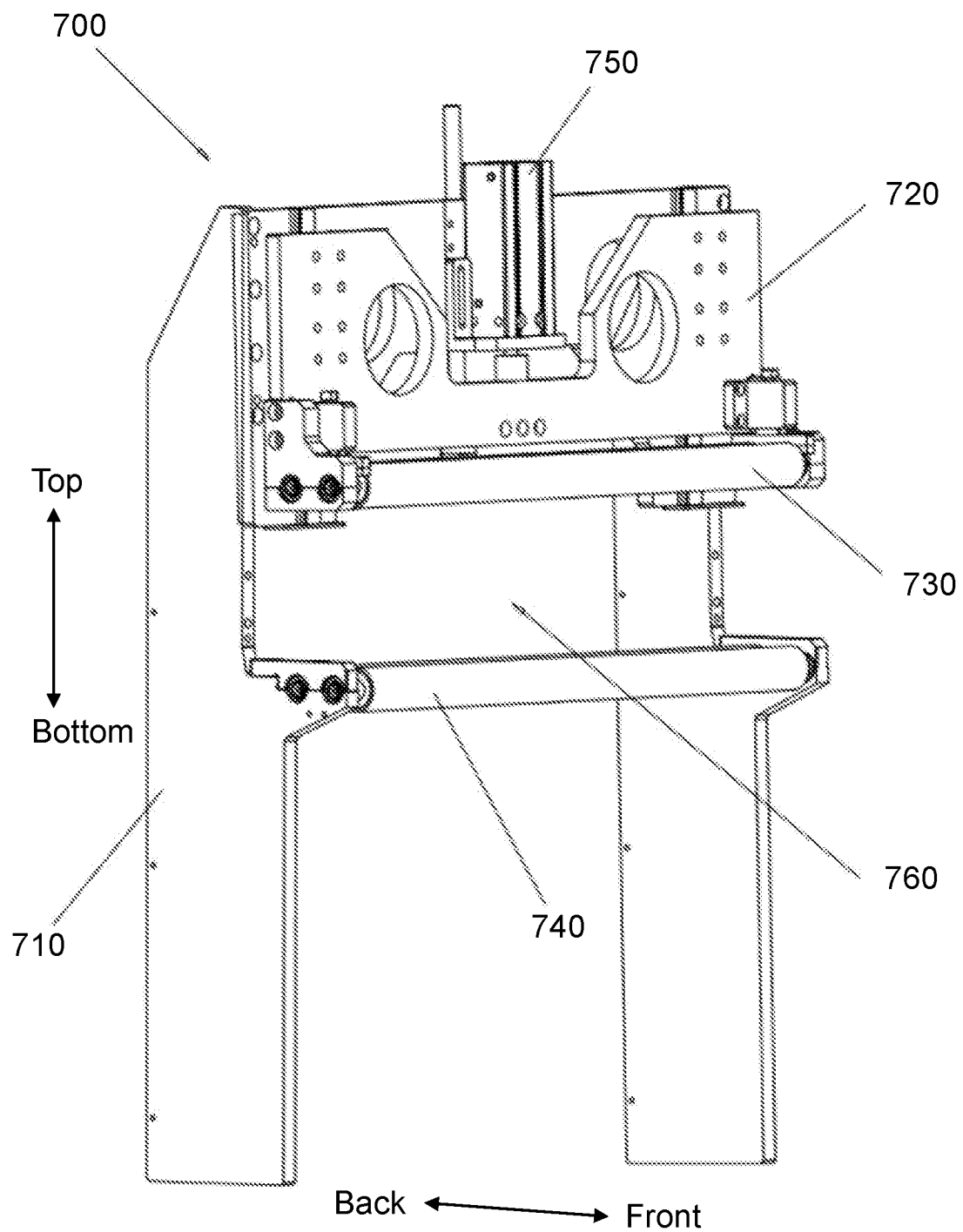
FIG. 13 is a schematic structural diagram illustrating a material charging apparatus according to some embodiments of the present disclosure.

FIG. 12 is a schematic diagram illustrating an assembly of a material feeding apparatus and a material charging apparatus according to some embodiments of the present disclosure. FIG. 13 is a schematic structural diagram illustrating a material charging apparatus according to some embodiments of the present disclosure.

As illustrated in FIG. 3, FIG. 12, and FIG. 13, in some embodiments, referring to direction identifiers, the alternate film pasting device may further include a material charging apparatus 700 disposed between the material feeding apparatus 200 and the two film feeding apparatuses 300. The material charging apparatus 700 is an apparatus used for pushing the bare materials 900 to the film pasting apparatus 400. The material charging apparatus 700 may include a material charging bracket 710, a material charging slide plate 720, a first material charging roller 730, a second material charging roller 740, and a material charging slide plate drive part 750. The material charging bracket 710 may be disposed on the frame 100. The material charging slide plate 720 may be disposed above the material feeding channel 221. The material charging slide plate 720 may be slidably disposed on the material charging bracket 710 in a vertical direction. The first material charging roller 730 may be rollable disposed at a lower end of the material charging slide plate 720. The second material charging roller 740 may be rollable disposed on the material charging bracket 700. The second feeding roller 740 may be disposed below the first material charging roller 730. A material charging channel 760 used for transporting the bare materials 900 to the film pasting channel 440 may be formed between the first material charging roller 730 and the second material charging roller 740. The material charging slide plate drive part 750 may be connected with the material charging slide plate 720 in the drive manner to drive the first material charging roller 730 to move toward or away from the second material charging roller 740.

In some embodiments, referring to direction identifiers in FIG. 12 and FIG. 13, the material charging bracket 710 may be vertically arranged on the frame 100. The material charging slide plate 720 may be arranged on a side wall of the material charging bracket 710 close to the material feeding apparatus 200 and may slide along the vertical direction. A charging slide rail may be provided between the material charging bracket 710 and the material charging slide plate 720. The material charging slide rail may be vertically arranged and fixedly installed on the material charging bracket 710. The material charging slide plate 720 may be slidably disposed on the material charging slide rail. The first material charging roller 730 may be rollable disposed on the lower end of the material charging slide rail 720. Merely by way of example, two ends of the first material charging roller 730 may be respectively provided with a first bearing pedestal. The two ends of the first material charging roller 730 may be respectively threaded through bearings of the two first bearing pedestals and rotationally connected with the bearings. The two first bearing pedestals may be fixedly connected with the material charging slide plate 720. Two ends of the second material charging roller 740 may be respectively provided with a second bearing pedestal. The two ends of the second material charging roller 740 may be respectively threaded through bearings of the two second bearing pedestals and rotationally connected with the bearings. The two second bearing pedestals may be fixedly connected with the material charging bracket 710. The material charging slide plate drive part 750 may be fixedly installed on the material charging bracket 710 and located above the material charging slide plate 720. In some embodiments, the material charging slide plate drive part 750 may be any drive parts capable of realizing linear driving, such as a linear module and a cylinder. An output end of the material charging slide plate drive part 750 may be connected with the material charging slide plate 720 to drive the first material charging roller 730 to move vertically, thereby realizing position limiting of the bare materials 900 conveyed into in the material charging channel 760, reducing the possibility of shifting of the bare materials 900 during the conveying process, and ensuring that the bare materials are fed and aligned with the insulating film 820.

In some embodiments, the alternate film pasting device may further include a plurality of sensors and a sensor signal processing system. Each of the plurality of sensors may correspond to each of a plurality of positions on the alternate film pasting device.

The plurality of sensors refer to apparatuses used for obtaining images related to in-place information on whether the insulating film 820, the bare materials 900, and the film pasting material are in place during the film pasting process. For example, the images related to the in-place information may be obtained at one or more of a material feeding phase, a film feeding phase, a phase of preparing for film pasting, a film pasting phase, a post-film pasting phase, or the like. The plurality of sensors may include an infrared sensor camera, an infrared imager, or a laser scanner, etc.

In some embodiments, the sensor signal processing system may initiate a corresponding drive operation or correct a deviation or issue an alarm or alert if an abnormality cannot be eliminated based on the in-place information of the insulating film 820, the bare materials 900, and the film pasting material.

In some embodiments, in response to a determination that the insulating film 820, the bare materials 900, or the film pasting material has an abnormality, the sensor signal processing system may issue a shutdown instruction or a pause instruction to stop/pause the operation of the alternate film pasting device.

In some embodiments, the alternate film pasting device may further includes a film pasting visual detection unit, a processor, a film pasting tension sensor, and a film pasting pressure sensor. The film pasting visual detection unit may be disposed in the film pasting channel 440. The processor may be configured to: at any preset time during film pasting of the bare materials 900, control the film pasting visual detection unit to obtain a film pasting image; control and adjust a film pasting tension of the insulating film 820 and a film pasting pressure of the two film pasting rollers 420 located below and/or the two film pasting rollers 420 located above based on the film pasting image; and identify a texture abnormality region, in response to a determination that at least one texture abnormality region is identified, determine, based on regional features of the at least one identified texture abnormality region, a tension parameter of a tension unit and an extrusion parameter of an extrusion unit, generate, based on the tension parameter of the tension unit and the extrusion parameter of the extrusion unit, a control instruction, and send the control instruction to force sensors, the force sensors referring to a membrane magnetic particle tensiometer and a compressive stress gauge, respectively.

The film pasting visual detection unit refers to an imaging component that captures a film pasting status, such as a digital camera, an infrared camera, or a three-dimensional (3D) scanner.

The extrusion unit refers to a component that applies a pressure during the film pasting process, such as a roller, a platen, or an air cushion extrusion system, etc.

The film pasting image refers to an image presenting a pasted status of the insulating film 820 and the bare materials 900. In some embodiments, the film pasting image may be obtained by taking a timed shot or a continuous shot of the insulating film 820 and the bare materials 900 after film pasting through the film pasting visual detection unit.

The regional features refer to features used to characterize a situation related to the texture abnormality region. In some embodiments, the regional features may include at least a location, a size, or a count of a region.

The region location is a relative position of the texture abnormality region on a surface of a battery. For example, using a corner of the upper surface of the battery as a coordinate origin, the region location may be denoted by corner coordinates of a diagonal of the region $(x_{min}, y_{min})$ and $(x_{max}, y_{max})$.

In some embodiments, the processor may obtain the location of the texture abnormality region based on the film pasting image. For example, the processor may locate the texture abnormality region based on algorithms such as edge detection, shape recognition, image segmentation, etc.

In some embodiments, the processor may recognize the texture abnormality region based on the film pasting image through an image recognition model.

In some embodiments, the image recognition model may be a machine learning model for recognizing the film pasting image. In some embodiments, the image recognition model may be any one of a convolutional neural network (CNN) or other customized model structure, or the like, or any combination thereof.

In some embodiments, an input of the image recognition model may include the film pasting image, and an output of the image recognition model may include the texture abnormality region and the regional features corresponding to the texture abnormality region. In some embodiments, the image recognition model may be obtained by training based on a large number of first training samples with first labels. The first training samples may be sample film pasting images, which may be obtained based on historical data. The first labels corresponding to the first training samples may be actual texture abnormality regions corresponding to the first training samples and actual regional features corresponding to the actual texture abnormality regions, which may be labeled manually.

The extrusion parameter refers to a series of parameters used to control the extrusion unit during the film pasting process. In some embodiments, the extrusion parameter may include an extrusion force, an extrusion speed, an extrusion path, an extrusion force at each point on the extrusion path, or the like. The extrusion speed and the extrusion force respectively refer to a speed and a pressure at which the extrusion unit extrudes the bare materials after film pasting. The extrusion path refers to a route when the extrusion unit extrudes the bare materials after film pasting. When the texture abnormality region exists in the bare materials after film pasting, the extrusion unit may perform extrusion along a linear extrusion path. When a plurality of texture abnormality regions exist in the bare materials after film pasting, locations of the plurality of texture abnormality regions may not be on a straight line, and the extrusion unit may perform extrusion along a polyline extrusion path. In some embodiments, in response to the existence of a texture abnormality region, the processor may determine two reference points in an edge of the texture abnormality region and determine a straight line by connecting the two reference points as the extrusion path through which the extrusion unit passes the texture abnormality region. In some implementations, in response to the existence of the plurality of texture abnormality regions, the processor may first determine an extrusion path within each of the plurality of texture abnormality regions, then connect two closest reference points on edges of two adjacent texture abnormality regions, and determine a connection line of connecting two closest reference points as the extrusion path for the extrusion unit to move from one texture abnormality region to another texture abnormality region, so that the polyline extrusion path may be obtained.

In some embodiments, the processor may determine the extrusion parameter of the extrusion unit through a prediction model based on the regional features of the at least one texture abnormality region and candidate extrusion parameters.

The candidate extrusion parameters refer to alternative extrusion parameters. In some embodiments, the processor may generate a plurality of candidate extrusion parameters. Each of the plurality of candidate extrusion parameters may include a candidate extrusion path and a candidate extrusion force for each point on the candidate extrusion path.

In some embodiments, the processor may generate the plurality of candidate extrusion parameters in various ways. For example, the processor may obtain the plurality of candidate extrusion parameters based on historical data or random generation.

In some embodiments, the processor may predict an estimated texture abnormality elimination degree corresponding to each of the plurality of candidate extrusion parameters through the prediction model; and determine candidate extrusion parameters that satisfy a preset condition based on the estimated texture abnormality elimination degree, and determine a candidate extrusion parameter of the plurality of candidate extrusion parameters with a shortest extrusion path as the extrusion parameter of the extrusion unit.

The texture abnormality elimination degree is an elimination degree of the texture abnormality region between the insulating film 820 and the bare materials 900 after the extrusion unit performs extrusion. In some embodiments, the texture abnormality elimination degree may be denoted as a value obtained by dividing a count of remaining texture abnormality regions after extrusion is performed by a count of texture abnormality regions before extrusion is performed.

The preset condition is a condition that the film pasting material after elimination of the texture abnormality region meets discharging criteria, e.g., a count of eliminated texture abnormality regions is greater than a predetermined threshold.

In some embodiments, the processor may directly use the candidate extrusion parameter corresponding to the estimated texture abnormality elimination degree that meets the preset condition as the extrusion parameter. In some embodiments, the prediction model may be a machine learning model used to predict the estimated texture abnormality elimination degree corresponding to each of the plurality of candidate extrusion parameters. In some embodiments, the prediction model may be a deep neural network (DNN), or other customized model structure, or the like, or any combination thereof.

In some embodiments, an input of the prediction model may include regional features of the at least one texture abnormality region and the candidate extrusion parameters, and an output of the prediction model may include the estimated texture abnormality elimination degree. When the estimated texture abnormality elimination degree of each of the plurality of candidate extrusion parameters is determined, each of the plurality of candidate extrusion parameters may be input into the prediction model, and the input regional features of the at least one texture abnormality region may keep constant. By applying the prediction model multiple times, the estimated texture abnormality elimination degree of each of the plurality of candidate extrusion parameters may be obtained.

In some embodiments, the prediction model may be trained in various ways based on a large number of second training samples with second labels. For example, the prediction model may be trained based on gradient descent and adaptive learning rate.

In some embodiments, the second training samples may be regional features of sample texture abnormality regions and sample candidate extrusion parameters. The second training samples may be obtained based on historical data. The second labels corresponding to the second training samples may be actual texture abnormality elimination degrees corresponding to the second training samples. The second labels may be obtained in various ways, such as manual labeling.

By accurately recognizing the texture abnormality region and adjusting the extrusion parameter, the texture abnormality region can be effectively reduced and the quality of film pasting can be improved. Meanwhile, intelligence enables the alternate film pasting device to adapt to different film pasting conditions, thereby improving the flexibility and the scope of application of the alternate film pasting device.

In some embodiments, the processor may be further configured to: determine an adjustment of a film pasting parameter based on abnormality statistical features of abnormal inflations recognized cumulatively within a preset time period. The abnormal inflations refer to an abnormal situation of the existence of the texture abnormality region during the film pasting process. The abnormality statistical features refer to features of statistical results of the abnormal inflations. In some embodiments, the abnormality statistical features may include a count of abnormalities, a frequency of abnormalities.

The film pasting parameters refer to working parameters of the two film pasting rollers 420 during the film pasting process, such as a speed and a pressure of the two film pasting rollers 420, a distance between the two film pasting rollers 420 and the materials, etc. In some embodiments, the film pasting parameters may include driving power of the film pasting drive part 430 to drive the two film pasting rollers 420 to move in a direction away from each other.

In some embodiments, the processor may determine the adjustment of the film pasting parameters by retrieving a preset table or a vector database in combination with the abnormality statistical features and current environmental features.

The environmental features refer to various external and internal conditions that affect the film pasting process, such as a humidity, a machine vibration level, an air flow direction, a temperature, a wind speed, etc.

The vector database may include a large number of historical environmental features, historical abnormality statistical features, historical film pasting parameter setting values, and adjustments corresponding to the film pasting parameters. In some embodiments, a matching manner of the vector database may include the following operations. The processor may match the environmental features and the abnormality statistical features in the current film pasting process with the historical data, and determine historical adjustments of film pasting parameters corresponding to the historical environmental features, whose vector distance (e.g., a Euclidean distance, a Chebyshev distance, etc.) from the current environmental features is minimum or less than a distance threshold, and the historical abnormality statistical features, whose vector distance (e.g., a Euclidean distance, a Chebyshev distance, etc.) is minimum or less than a distance threshold from the current abnormality statistical features, as the adjustments of the current film pasting process.

The preset table may include a large number of correspondences among the historical environmental features, the historical abnormality statistical features, the historical film pasting parameter setting values, and the adjustments corresponding to the film pasting parameters. The processor may determine the adjustments of the film pasting parameters corresponding to the historical environmental features and the abnormality statistical features similar to current environmental features and the current abnormality statistical features as the adjustments of the current film pasting process by querying the preset table based on the environmental features and the abnormality statistical features in the current film pasting process.

The preset table or the vector database may be constructed in various ways. For example, the preset table or the vector database may be constructed based on the historical data, experimental results, or simulation and prediction.

In some embodiments, the preset table or the vector database may be constructed based on historical adjustment situations, and adjustments that significantly reduce texture abnormalities after the adjustments are performed in various scenarios may be used as recommended adjustments in the scenarios.

When continuous abnormalities occur in film pasting, a possible cause may be that the film pasting rollers move too fast or too slow, resulting in more frequent texture abnormalities. Accordingly, by dynamically adjusting a movement speed of the film pasting rollers, the texture abnormalities may be reduced.

In addition, the indicated orientations or positional relationships described in the embodiments of the present disclosure are all based on the orientations or positional relationships shown in the accompanying drawings, which are only for the convenience of describing the embodiments of the present disclosure and simplifying the description, rather than indicating or implying that the device or structure referred to must have a specific orientation, or operate in a specific orientation structure, so they cannot be understood as limiting the embodiments of the present disclosure.

In the embodiments of the present disclosure, unless otherwise clearly stated and limited, terms such as "connection" and "disposed" should be understood in a broad sense. For example, the "connection" may be a fixed connection, a detachable connection, or an integration; which may be a mechanical connection or an electrical connection; which may also be a direct connection or an indirect connection through an intermediate medium; which may further be an internal connection between two components or an interaction between two components. For those having ordinary skills in the art, the specific meanings of the above terms in the embodiments of the present disclosure can be understood according to specific circumstances. In addition, it may be directly on another component or indirectly on the other component. When a component is to be "connected" to another component, it may be directly connected to the other component or indirectly connected to the other component.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An alternate film pasting device for a hard-case secondary battery, comprising:

a frame provided with a material feeding channel used for conveying bare materials, wherein a film pasting channel used for pasting an insulating film onto the bare materials is provided at an output end of the material feeding channel;

a material feeding apparatus disposed on the frame, wherein the material feeding apparatus comprises two material pushing mechanisms used for pushing the bare materials from the material feeding channel to the film pasting channel; and the two material pushing mechanisms both reciprocate along a vertical direction, and one of the two material pushing mechanisms moves downward and retract after pushing a part of the bare materials to the film pasting channel to avoid the other of the two material pushing mechanisms, and the other of the two material pushing mechanisms pushes the other of the bare materials to the film pasting channel; and two film feeding apparatuses both disposed on the frame and used for alternately conveying, in turn, the insulating film to the bare materials reaching the film pasting channel; wherein the material feeding apparatus further includes a base, two half-material racks, and a material pushing and bearing plate, wherein the base is horizontally disposed on the frame, and the two half-material racks are disposed on the base at intervals to form the material feeding channel; the material pushing and bearing plate is vertically disposed on the base and located below the material feeding channel, the material pushing and bearing plate is disposed between the two half-material racks, an extension direction of the material pushing and bearing plate is parallel to an extension direction of the material feeding channel, and the two material pushing mechanisms are disposed on two opposite sides of the material pushing and bearing plate, respectively;

each of the two material pushing mechanisms includes a material pushing component and a material pushing drive component, a material pushing slide rail parallel to an extension direction of the material pushing and bearing plate is disposed on the material pushing and berating plate, a material pushing slide block cooperated with the material pushing slide rail is disposed on the material pushing component, the material pushing component is slidably disposed on the material pushing and bearing plate along the extension direction of the material pushing and bearing plate, and an output end of the material pushing component is used for pushing the bare materials from the material feeding channel to the film pasting channel; an output end of the material pushing drive component is connected with the material pushing component to drive the material pushing component to slide on the material pushing and bearing plate;

the material pushing component includes a material pushing slide plate and a material pushing part, the material pushing slide plate is slidably disposed on the material pushing and bearing plate along an extension direction of the material feeding channel, and the material pushing drive component is connected with the material pushing slide plate; the material pushing part includes a pusher and a material pushing bracket, the pusher is disposed above the material pushing slide plate; and the material pushing drive component is used for driving the material pushing slide plate to slide, so that the pusher pushes the bare materials to move in the material feeding channel along the extension direction of the material feeding channel;

the material feeding apparatus further includes two lifting mechanisms connected with two material pushing slide plates, respectively; each of the two lifting mechanisms includes a lifting slide plate and a lifting drive part, and the lifting slide plate is slidably disposed on each of the two material pushing slide plates in a vertical direction; and an output end of the lifting drive part is connected with the lifting slide plate, and the pusher is disposed above the lifting slide plate through the material pushing bracket, and the lifting drive part is used for pushing the lifting slide plate to move vertically to make the pusher reciprocate in the vertical direction; and one of the two pushers is driven to move downward by the lifting drive part after one of the two pushers pushes the part of the bare materials to the film pasting channel, so as to avoid the other of the two pushers, and the other of the two pushers pushes the other of the bare materials to the film pasting channel.

2. The alternate film pasting device according to claim 1, wherein the two film feeding apparatuses are symmetrically and vertically arranged along a center line of an entrance of the film pasting channel; each of the two film feeding apparatuses includes a film drawing mechanism, and the film drawing mechanism is disposed on the frame;

the film drawing mechanism includes a film drawing support, two film drawing slide plates, a film drawing rod, and a film drawing drive component, the film drawing support is vertically disposed on the frame, and the two film drawing slide plates are slidably disposed on two opposite sides of the film drawing support in the vertical direction; two ends of the film drawing rod are respectively connected with the two film drawing slide plates, a film head of the insulating film is adhered to an outer periphery of the film drawing rod, an output end of the film drawing drive component is connected with the two film drawing slide plates, and the film drawing drive component is used for driving the film drawing rod to move vertically near the entrance of the film pasting channel, so that the insulating film incline toward the entrance of the film pasting channel in the vertical direction; the film drawing rod located above is used for driving the film head of the insulating film to move downward and blocking the entrance of the film pasting channel to prepare for film pasting, after the bare materials pass through the film pasting channel, the film drawing rod located above is capable of moving upward to remove a film and retracting to a position above and near the entrance of the film pasting channel to continue to paste the insulating film above to prepare for next film drawing; the film drawing rod located below is used for driving the film head of another insulating film to move upward and blocking the entrance of the film pasting channel to prepare for film pasting, and after the other of the bare materials pass through the film pasting channel, the film drawing rod located below is capable of moving downward to remove the film and retracting to a position below and near the entrance of the film pasting channel and continue to paste the another insulating film below to prepare for the next film drawing.

3. The alternate film pasting device according to claim 2, wherein each of the two film feeding apparatuses further includes a film releasing mechanism, and the film releasing mechanism is disposed on one side of the film drawing mechanism;

the film releasing mechanism includes a film releasing bracket, a film releasing roller, and a collecting roller, the film releasing bracket is disposed on the frame, and the film releasing roller and the collecting roller are both disposed on the film releasing bracket;

the film releasing roller is used for supporting a rolled double-layer film, the double-layer film includes the insulating film and a release film, the insulating film is drawn by the film drawing rod to separate the insulating film from the release film; and the collecting roller is used for rolling the release film to collect the release film.

4. The alternate film pasting device according to claim 1, wherein the material feeding apparatus further includes a transfer mechanism; the transfer mechanism includes a transfer drive part and a transfer bracket, the transfer bracket is fixed on the frame, the transfer drive part is fixed on the transfer bracket, and a movable end of the transfer drive part is connected with the base to drive the base to slide on the frame along an extension direction of the material feeding channel.

5. The alternate film pasting device according to claim 2, wherein the alternate film pasting device further includes a film pasting apparatus located at a side of each of the two film feeding apparatuses away from the material feeding apparatus and disposed on the frame;

the film pasting apparatus includes a film pasting bracket and two film pasting rollers, the film pasting bracket includes a film pasting bracket body and two film pasting slide plates, the film pasting bracket body is disposed on the frame, and the two film pasting slide plates are slidably disposed on a side wall of the film pasting bracket body close to the material feeding apparatus at an opposite position in the vertical direction;

the two film pasting rollers are rollable disposed at ends of the two film pasting slide plates close to each other, and the film pasting channel used for pasting the insulating film onto the bare materials is formed between the two film pasting rollers; and the film pasting apparatus further includes two film pasting drive parts which are connected with the two film pasting slide plates, respectively, to drive the two film pasting rollers to move toward or away from each other.

6. The alternate film pasting device according to claim 5, wherein the alternate film pasting device further includes two film cutting apparatuses, the two film cutting apparatuses are disposed on the film pasting bracket body and located above and below a position near an exit of the film pasting channel, respectively; and each of the two film cutting apparatuses includes a film cutting knife holder, a film cutting blade, and a film cutting drive component, the film cutting knife holder and the film cutting blade are fixedly connected, the film cutting blade is arranged vertically, the film cutting drive component is disposed on each of the film pasting bracket body and is slidingly connected with the film cutting knife holder for driving the film cutting knife holder to carry the film cutting blade to horizontally slide along a width direction of the insulating film, and the each of the two film cutting apparatuses is used for cutting the insulating film between the bare materials and the film drawing rod pasting the insulating film below the position near the entrance of the film pasting channel at a preset position after the bare materials pass through the film pasting channel, to complete the film pasting.

7. The alternate film pasting device according to claim 5, wherein the alternate film pasting device further includes a discharging apparatus; the discharging apparatus includes a discharging driving roller, a discharging driven roller, a discharging slide plate, and a discharging slide plate drive part, and the discharging driving roller and the discharging driven roller are rollable disposed on a side wall of the film pasting bracket body away from the film pasting slide plate, wherein the discharging driving roller is located below the discharging driven roller, a discharging channel used for transporting a film pasting material out is formed between the discharging driving roller and the discharging driven roller;

the discharging slide plate is disposed above the discharging driven roller and is slidably disposed on the film pasting bracket body in the vertical direction, and the discharging driven roller is rollable disposed at a lower end of the discharging slide plate; and the discharging slide plate drive part is connected with the discharging slide plate to drive the discharging driven roller move toward or away from the discharging driving roller.

8. The alternate film pasting device according to claim 1, wherein the alternate film pasting device further includes a material charging apparatus disposed between the material feeding apparatus and the film feeding apparatus;

the material charging apparatus includes a material charging bracket, a material charging slide plate, a first material charging roller, a second material charging roller, and a material charging slide plate drive part; the material charging bracket is disposed on the frame, the material charging slide plate is disposed above the material feeding channel, the material charging slide plate is slidably disposed on the material charging bracket in the vertical direction, the first material charging roller is rollable disposed at a lower end of the material charging slide plate, the second material charging roller is rollable disposed on the material charging bracket, the second feeding roller is disposed below the first material charging roller, and a material charging channel used for transporting the bare materials to the film pasting channel is formed between the first material charging roller and the second material charging roller; and the material charging slide plate drive part is connected with the material charging slide plate to drive the first material charging roller to move toward or away from the second material charging roller.

* * * * *